United States Patent
Okabe et al.

(10) Patent No.: US 8,887,863 B2
(45) Date of Patent: Nov. 18, 2014

(54) MAT MEMBER, METHOD FOR MANUFACTURING THE MAT MEMBER, MUFFLER AND METHOD FOR MANUFACTURING THE MUFFLER

(75) Inventors: Takahiko Okabe, Takahama (JP); Daisuke Suzuki, Takahama (JP)

(73) Assignee: Ibiden Co., Ltd., Ogaki-shi (JP)

( * ) Notice: Subject to any disclaimer, the term of this patent is extended or adjusted under 35 U.S.C. 154(b) by 1077 days.

(21) Appl. No.: 12/245,798

(22) Filed: Oct. 6, 2008

(65) Prior Publication Data
US 2009/0272600 A1 Nov. 5, 2009

(30) Foreign Application Priority Data
Apr. 30, 2008 (JP) .................... PCT/JP2008/058288

(51) Int. Cl.
*F01N 13/08* (2010.01)
*F01N 13/14* (2010.01)
*F01N 13/16* (2010.01)
*F01N 1/24* (2006.01)
*D04H 3/10* (2012.01)
*B23P 11/00* (2006.01)
*B23P 19/00* (2006.01)
*C04B 35/64* (2006.01)
*D04H 1/46* (2012.01)
*D04H 1/48* (2012.01)
*F01N 3/28* (2006.01)
*D04H 1/4218* (2012.01)
*D04H 1/4209* (2012.01)
*F01N 1/04* (2006.01)
*D04H 1/488* (2012.01)

(52) U.S. Cl.
CPC ............... *F01N 1/04* (2013.01); *F01N 2310/02* (2013.01); *F01N 3/2853* (2013.01); *D04H 1/46* (2013.01); *D04H 1/4218* (2013.01); *D04H 1/4209* (2013.01); *D04H 1/488* (2013.01)
USPC ........... 181/256; 442/402; 442/406; 264/624; 264/627; 264/639; 264/640; 29/890.08; 28/106; 28/107; 28/108; 181/227

(58) Field of Classification Search
USPC ...................... 442/402–407, 365; 428/92, 93, 428/372–374, 379, 384; 29/419.1, 890.08; 28/107–115; 181/248–256
See application file for complete search history.

(56) References Cited

U.S. PATENT DOCUMENTS 3,975,565 A * 8/1976 Kendall ......................... 442/388
5,670,756 A * 9/1997 Ohtaka et al. .................. 181/256
(Continued)

FOREIGN PATENT DOCUMENTS

CN 2408240 Y 11/2000
CN 1969111 5/2007
(Continued)

OTHER PUBLICATIONS
"Glass Fibers" by Frederick Wallenberger, copywrite ASM International.*
(Continued)

*Primary Examiner* — Jennifer A Steele
(74) *Attorney, Agent, or Firm* — Mori & Ward, LLP

(57) ABSTRACT

A mat member includes inorganic fibers, a first surface and a second surface opposite to the first surface. The first surface has a plurality of needle penetration marks and/or a plurality of needle protrusion marks. The second surface has a plurality of needle protrusion marks and/or a plurality of needle penetration marks. A plurality of needle marks are formed in the mat member by needle punching and extend from the needle penetration mark to the needle protrusion mark. An inorganic fiber bundle which includes a plurality of the inorganic fibers oriented in a closed loop configuration is formed at the needle protrusion mark.

23 Claims, 9 Drawing Sheets

(56) References Cited

U.S. PATENT DOCUMENTS

| | | | |
|---|---|---|---|
| 5,992,560 A | 11/1999 | Matsuoka et al. | |
| 6,092,622 A * | 7/2000 | Hiers et al. | 181/290 |
| 6,251,498 B1 | 6/2001 | Fukushima et al. | |
| 6,258,739 B1 * | 7/2001 | Meng et al. | 442/402 |
| 2004/0052694 A1 | 3/2004 | Nishikawa et al. | |
| 2004/0234428 A1 * | 11/2004 | Tanahashi et al. | 422/180 |

FOREIGN PATENT DOCUMENTS

| | | | |
|---|---|---|---|
| EP | 1464800 | 10/2004 | |
| EP | 1696110 | 8/2006 | |
| EP | 1867847 | 12/2007 | |
| EP | 1908934 | 4/2008 | |
| JP | 63-030393 | 2/1988 | |
| JP | 63-242978 | 10/1988 | |
| JP | 04-308264 | * 10/1992 | D04H 1/42 |
| JP | 8-100627 | 4/1996 | |
| JP | 2000-303834 | 10/2000 | |
| JP | 2003-106133 | 4/2003 | |
| JP | 2003-214156 | 7/2003 | |
| JP | 2005-069190 | 3/2005 | |
| JP | 2006-022817 | 1/2006 | |
| JP | 2006-207393 | 8/2006 | |
| JP | 2007-162583 | 6/2007 | |
| KR | 10-2002-0068056 | 8/2002 | |
| KR | 10-2006-0008972 | 1/2006 | |
| WO | WO 2004/099576 | 11/2004 | |
| WO | WO 2005/106222 | 11/2005 | |

OTHER PUBLICATIONS

"Glass Fibers" by Frederick Wallenberger, ASM Handbook vol. 21: Composites; copywrite ASM International, 2001, pp. 27-34.*

Chinese Office Action for corresponding CN Application No. 200910132415.3, Nov. 1, 2010.

* cited by examiner

A-A line cross-sectional view

D-D line cross-sectional view

MAT MEMBER, METHOD FOR MANUFACTURING THE MAT MEMBER, MUFFLER AND METHOD FOR MANUFACTURING THE MUFFLER

CROSS REFERENCE TO RELATED APPLICATIONS

The present application claims priority under 35 U.S.C. §119 to PCT Application No. PCT/JP2008/058288 filed on Apr. 30, 2008the contents of which are incorporated herein by reference in their entirety.

BACKGROUND OF THE INVENTION

1. Field of the Invention

The present invention relates to a mat member, a method for manufacturing the mat member, a muffler, and a method for manufacturing the muffler.

2. Discussion of the Background Art

Conventionally, it has been known that, in an internal combustion engine of an automobile or the like, noise is generated when exhaust gases, generated by the internal combustion engine, are discharged outside through an exhaust path.

Therefore, in order to reduce the noise, various mufflers to be installed in the exhaust path have been proposed.

In particular, in order to reduce noise in a high frequency range, a muffler including a mat member formed by inorganic fibers and the like, an inner pipe having a plurality of small holes around which the mat member is wrapped, and an outer pipe in which the mat member and the inner pipe are installed, has been used.

In a muffler of the above-mentioned kind, in general, exhaust gases discharged from an internal combustion engine are allowed to flow through the exhaust path into the inner pipe from the inlet side of the inner pipe. Then, the exhaust gases that have passed through the inner pipe are discharged outside from the outlet side of the inner pipe. At this time, noise in a high frequency range can be absorbed, diffused or otherwise treated by a plurality of small holes formed in the inner pipe and the mat member that surrounds these small holes. By forming the muffler in this kind of structure, it becomes possible to reduce, in particular, noise in a high frequency range.

A mat member that uses crystalline alumina fibers with its crystallinity controlled is disclosed as the mat member to be used for a muffler of the above-mentioned kind (JP-A 2006-022817).

The contents of JP-A 2006-022817 are incorporated herein by reference in their entirety.

SUMMARY OF THE INVENTION

According to one aspect of the present invention, a mat member includes inorganic fibers, a first surface and a second surface opposite to the first surface. The first surface has a plurality of needle penetration marks and/or a plurality of needle protrusion marks. The second surface has a plurality of needle protrusion marks and/or a plurality of needle penetration marks. A plurality of needle marks are formed in the mat member by needle punching and extend from the needle penetration mark to the needle protrusion mark. An inorganic fiber bundle which includes a plurality of the inorganic fibers oriented in a closed loop configuration is formed at the needle protrusion mark.

According to another aspect of the present invention, a method for manufacturing a mat member includes spinning a spinning mixture containing at least an inorganic compound and an organic polymer to manufacture an inorganic fiber precursor, compressing the inorganic fiber precursor to manufacture a sheet member, punching the sheet member with at least one needle from at least one of a first surface of the sheet member and a second surface of the sheet member opposite to the first surface to manufacture a needle-punched body in which a bundle-shaped inorganic fiber precursor including the inorganic fiber precursor oriented in a closed loop configuration is formed on at least one of the first surface and the second surface. The needle-punched body is fired so as to produce a mat member containing inorganic fibers and having inorganic fiber bundles which are formed by firing the bundle-shaped inorganic fiber precursor.

According to further aspect of the present invention, a muffler to be placed on an exhaust path of an internal combustion engine includes an inner pipe, a mat member, an outer pipe, and first and second end portion members. The inner pipe has a side surface and a plurality of holes provided on the side surface. The mat member includes inorganic fibers, a first surface and a second surface opposite to the first surface. The first surface has a plurality of needle penetration marks and/or a plurality of needle protrusion marks. The second surface has a plurality of needle protrusion marks and/or a plurality of needle penetration marks. A plurality of needle marks are formed in the mat member by needle punching and extend from the needle penetration mark to the needle protrusion mark. An inorganic fiber bundle which includes a plurality of the inorganic fibers oriented in a closed loop configuration is formed at the needle protrusion mark. The mat member is wrapped around the side surface of the inner pipe. The outer pipe has first and second end openings and contains the inner pipe wrapped with the mat member. The first and second end portion members are disposed to close the first and second end openings, respectively.

According to the other aspect of the present invention, a muffler to be placed on an exhaust path of an internal combustion engine includes an inner pipe, a mat member which is wrapped around the side surface of the inner pipe, an outer pipe, and first and second end portion members. The inner pipe has a side surface and a plurality of holes provided on the side surface. A spinning mixture containing at least an inorganic compound and an organic polymer is spun to manufacture an inorganic fiber precursor. The inorganic fiber precursor is compressed to manufacture a sheet member. The sheet member is punched with at least one needle from at least one of a first surface of the sheet member and a second surface of the sheet member opposite to the first surface to manufacture a needle-punched body in which a bundle-shaped inorganic fiber precursor including the inorganic fiber precursor oriented in a closed loop configuration is formed on at least one of the first surface and the second surface. The needle-punched body is fired so as to produce a mat member containing inorganic fibers. The outer pipe has first and second end openings and contains the inner pipe wrapped with the mat member. First and second end portion members are disposed to close the first and second end openings, respectively.

According to yet the other aspect of the present invention, a method for manufacturing a muffler includes providing a mat member. The mat member includes inorganic fibers, a first surface and a second surface opposite to the first surface. The first surface has a plurality of needle penetration marks and/or a plurality of needle protrusion marks. The second surface has a plurality of needle protrusion marks and/or a plurality of needle penetration marks. A plurality of needle marks are formed in the mat member by needle punching and extend from the needle penetration mark to the needle protrusion mark. An inorganic fiber bundle which includes a plurality of the inorganic fibers oriented in a closed loop configuration is formed at the needle protrusion mark. The mat member is wrapped around a side surface of an inner pipe having a plurality of small holes. The inner pipe wrapped with the mat member is press-fitted into an outer pipe to produce a press-fitted body in a manner that the inorganic fiber bundles contact an inner surface of the outer pipe. First and second end portion members are disposed to close first and second end openings of the outer pipe, respectively. The first and second end portion members are secured to the outer pipe.

According to yet another aspect of the present invention, a method for manufacturing a muffler includes spinning a spinning mixture containing at least an inorganic compound and an organic polymer to manufacture an inorganic fiber precursor, compressing the inorganic fiber precursor to manufacture a sheet member, punching the sheet member with at least one needle from at least one of a first surface of the sheet member and a second surface of the sheet member opposite to the first surface to manufacture a needle-punched body in which a bundle-shaped inorganic fiber precursor including the inorganic fiber precursor oriented in a closed loop configuration is formed on at least one of the first surface and the second surface, firing the needle-punched body so as to produce a mat member containing inorganic fibers and having inorganic fiber bundles which are formed by firing the bundle-shaped inorganic fiber precursor, wrapping the mat member around a side surface of an inner pipe having a plurality of small holes, press-fitting the inner pipe wrapped with the mat member into an outer pipe to produce a press-fitted body in a manner that the inorganic fiber bundles contact an inner surface of the outer pipe, disposing first and second end portion members to close first and second end openings of the outer pipe, respectively, and securing the first and second end portion members to the outer pipe

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
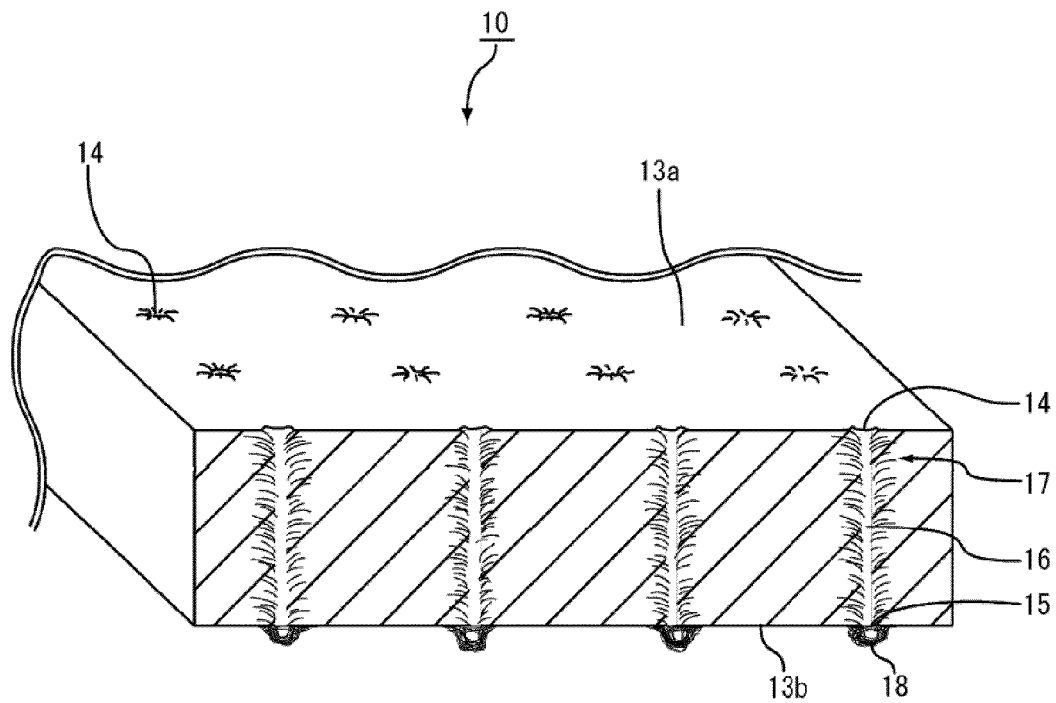
FIG. 1A is a partially cut-out perspective view which schematically illustrates a mat member, including a cross section obtained by cutting one example of the mat member according to one embodiment of the present invention along a thickness direction.

The embodiments will now be described with reference to the accompanying drawings, wherein like reference numerals designate corresponding or identical elements throughout the various drawings.

The mat member according to an embodiment of the present invention is a mat member mainly comprising inorganic fibers, the mat member having a plurality of needle marks formed by needle punching, each of the needle marks extending from a needle penetration mark formed on a surface of the mat member to a needle protrusion mark formed on a surface opposite to the surface where the needle penetration mark is formed, wherein an inorganic fiber bundle including a plurality of the inorganic fibers oriented in a closed loop configuration is formed at the needle penetration mark, and the inorganic fiber bundle is formed on at least one of the surfaces of the mat member.

A mat member according to the embodiment of the present invention is provided with a plurality of needle marks formed by needle punching, and each of the needle marks extends from a needle penetration mark formed on a surface of the mat member to a needle protrusion mark formed on a surface opposite to the surface where the needle penetration mark is formed.

That is, in the mat member, entangled inorganic fibers are generated at each needle mark and the vicinity of the needle mark over the entire mat member in the thickness direction, thereby making the interlayer strength of the entire mat member high. Therefore, when the mat member according to the embodiment of the present invention having the above-mentioned kind of structure is used for a muffler, detachment of the inorganic fibers due to stress caused by flow of exhaust gases tends to be reduced, and consequently damages to the entire mat member caused by wind erosion can more easily be reduced.

Therefore, the noise reduction effect can more easily be maintained over a long period of time.

Moreover, since the heat insulating property of the mat member is hardly impaired, temperature rise in the outer pipe can more easily be prevented from occurring. Consequently, it becomes easier to prevent occurrence of discoloration of the outer pipe due to heat. Therefore, the outside appearance of the outer pipe wrapped with the mat member is less likely to be deteriorated.

Here, in the present specification, the needle punching refers to a process of penetrating a plurality of needles through a sheet member, which is to be converted into a mat member by firing, from one of its surfaces to the other surface so as to form a sheet member. In the sheet member, inorganic fiber precursors to be converted into inorganic fibers by firing are intertwined with one another. Namely, the needle punching is a process of entangling the inorganic fiber precursors.

By firing the needle-punched sheet member, organic polymers contained in the inorganic fiber precursor are decomposed and burned out so that the mat member in which entangled inorganic fibers are generated can be obtained.

Here, the interlayer strength refers to a maximum stress under which the mat member can still maintain its original shape when a load is applied to the mat member by an operation such as stretching and tearing.

There is a correlation between the interlayer strength and the entanglement of the inorganic fibers in the mat member. As the degree of entanglement of the inorganic fibers becomes higher in the mat member, and also as the number of the entangled inorganic fibers is increased, the interlayer strength of the entire mat member becomes higher.

Referring to the Figures, the following description will explain the reason why the mat member according to the embodiment of the present invention can exert the above-mentioned effects.

FIG. 1A is a partially cut-out perspective view which schematically illustrates a mat member, including a cross section obtained by cutting one example of the mat member according to the embodiment of the present invention along a thickness direction.

A mat member 10 according to an embodiment of the present invention mainly contains inorganic fibers, and has a flat plate shape with a predetermined thickness that is formed into a substantially rectangular shape in the plan view. With respect to the outside shape of the mat member 10 according to the embodiment of the present invention, the explanation thereof will be given later in the description of a first embodiment. The following description will first discuss detailed structures of the surface and the inside of the mat member 10 according to the embodiment of the present invention.

As shown in FIG. 1A, on a surface 13a of the mat member 10 according to the embodiment of the present invention, needle penetration marks 14 are formed at portions where needles are allowed to penetrate by the above-mentioned needle punching. Moreover, on a surface 13b on the side opposite to the surface 13a where the needle penetration marks 14 are formed, needle protrusion marks 15 are formed at portions (portions corresponding to the needle penetration marks 14) where the needles have protruded. Here, inside the mat member 10, a plurality of needle marks 16 that extend from the needle penetration marks 14 to the needle protrusion marks 15 are formed, and an entangled inorganic fiber is generated at each of the needle marks 16 and the vicinity 17 of the needle marks 16.

The entangled inorganic fiber at each of the needle marks and the vicinity of the needle marks may be generated in the mechanism explained below.

Here, an explanation will be given by describing, as an example, a case in which a needle having a plurality of spine-shaped protrusions (barbs) that protrude toward the tip direction (penetration direction) formed substantially all over the side surface of the tip portion is used as the needles for punching.

In the case where the needle punching is carried out on the sheet member including inorganic fiber precursors by using the above-mentioned needles, first, the needles are allowed to penetrate a surface of the sheet member. Then, the barbs wind the inorganic fiber precursors near the needle into the proceeding direction of the needle so that the needle proceeds through the inorganic fiber precursors while generating entanglement of the inorganic fiber precursors around the needle. Thereafter, although the needle is drawn out, since the barbs are formed in the direction opposite to the needle-drawing direction, the inorganic fiber precursors are less likely to be again wound in by the barbs. For this reason, generation of the entangled inorganic fiber precursors are more likely to occur at each of the needle marks formed after the needle has been drawn out or the vicinity of each of the needle marks. Therefore, by firing this sheet member, a mat member in which the entangled inorganic fibers are generated at each of the needle marks and the vicinity of each of the needle marks can be obtained.

In this manner, in the mat member 10 according to the embodiment of the present invention, since entangled inorganic fibers are generated at the needle marks 16 and the vicinities 17 of the needle marks 16 over the entire mat member 10 in the thickness direction, the interlayer strength of the entire mat member 10 is higher in comparison to a mat member that is not needle-punched.

Therefore, when the mat member according to the embodiment of the present invention is used for a muffler, detachment of the inorganic fibers due to stress caused by flow of exhaust gases tends to be reduced, and consequently damages to the mat member due to wind erosion can more easily be reduced.

Moreover, as shown in FIG. 1A, at each of the plurality of needle protrusion marks 15 formed on the surface 13b of the mat member 10 according to the embodiment of the present invention, a plurality of the inorganic fibers forming the mat member 10 gather into a bundle so as to form an inorganic fiber bundle. Here, the respective inorganic fibers forming each inorganic fiber bundle 18 are oriented in a fixed direction so that each of the inorganic fiber bundles 18 forms a loop (hereinafter, alignment of the direction of the inorganic fibers to substantially a given direction is referred to also as orientation of the inorganic fibers). Moreover, both of the two end portions of each inorganic fiber bundle 18 are combined with the mat member so that the two end portions are closed so as to form a loop configuration (hereinafter, referred to as "closed loop configuration").

In this manner, in the mat member 10 according to the embodiment of the present invention, since the respective inorganic fibers forming the inorganic fiber bundle 18 are oriented in a closed loop configuration, the inorganic fibers hardly have fluffs. For example, in the case where a muffler is manufactured by using the mat member according to the embodiment of the present invention, the inorganic fibers forming the inorganic fiber bundles 18 become less likely to stick to the skin of an operator, and consequently a mat member that is very safe for the operator can more easily be provided.

Figure 1B:
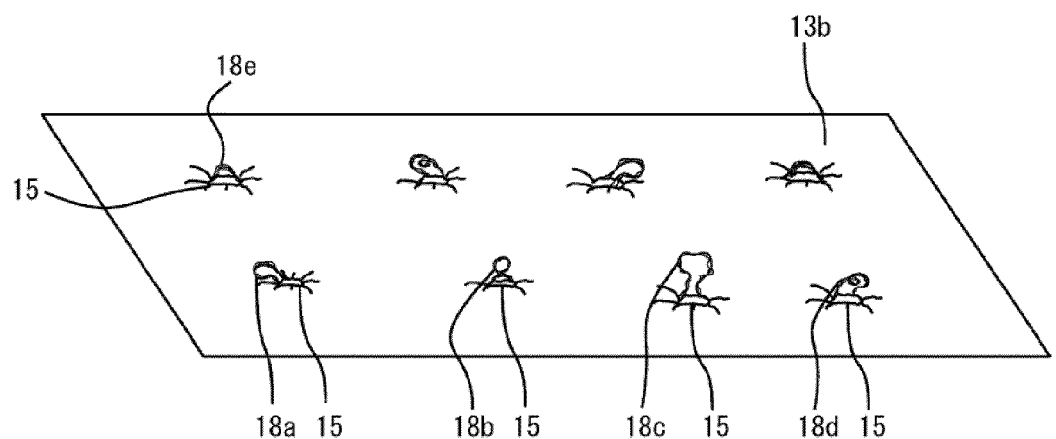
FIG. 1B is a perspective view that schematically shows the inorganic fiber bundles formed on the surface of the mat member shown in FIG. 1A.

The shape of the inorganic fiber bundles 18 is not particularly limited as long as it has the above-mentioned closed loop configuration, and an example of the shape is, for example, a shape shown in FIG. 1B. FIG. 1B is a perspective view that schematically shows the inorganic fiber bundles 18 formed on the surface 13*b* of the mat member 10 shown in FIG. 1A.

As shown in FIG. 1B, examples of the shape of the inorganic fiber bundles 18 include: a shape 18*a* in which an inorganic fiber bundle 18 oriented in a closed loop configuration is laid on the surface of the mat member 10; a shape 18*b* in which an inorganic fiber bundle 18 oriented in a closed loop configuration is twisted and crossed; a shape 18*c* in which an inorganic fiber bundle 18 oriented in a closed loop configuration projects from the surface of the mat member 10; a shape 18*d* in which one portion of an inorganic fiber bundle 18 oriented in a closed loop configuration forms a small loop; and a shape 18*e* in which an inorganic fiber bundle 18 oriented in a closed loop configuration slightly protrudes from the surface of the mat member 10.

The mechanism of formation of the inorganic fiber bundles 18 in the mat member according to the embodiment of the present invention may be explained as follows:

In the above-mentioned needle punching, each of the needles is allowed to proceed in the sheet member, while a plurality of inorganic fiber precursors wound in by the barb are entangled with the barb. In this process, the inorganic fiber precursors are oriented in a loop configuration along the barb formed substantially all over the side surface of the tip of the needle (hereinafter, the inorganic fiber precursors oriented in a loop configuration are referred to also as bundle-shaped inorganic fiber precursors). Here, by allowing the needles to protrude from the surface of the sheet member on the side opposite to the side into which the needles penetrate, the most part of the bundle-shaped inorganic fiber precursors are extruded from the needle protrusion marks. Thereafter, when the needles are drawn therefrom, the bundle-shaped inorganic fiber precursors are less likely to be wound again by the barb, because the barb is made to protrude in a direction reversed to the drawing direction of the needle. Consequently, on the needle protrusion marks on the surface of the sheet member, the bundle-shaped inorganic fiber precursors, each oriented in a closed loop configuration, are more likely to remain. Thus, firing of this sheet member can produce a mat member in which the inorganic fiber bundles, each formed by inorganic fibers that are oriented in a closed loop configuration, are formed on the needle protrusion marks on the surface of the mat member.

Here, the inorganic fiber bundles may be formed on all the needle protrusion marks, or may be formed on some of the needle protrusion marks.

In the mat member 10 according to the embodiment of the present invention, fine asperities are formed on the surface 13*b* of the mat member 10 by the inorganic fiber bundles 18 formed on the surface 13*b* of the mat member 10. When the surface 13*b* of the mat member 10 makes contact with the surface of another object, these fine asperities make the contact area smaller so that the coefficient of friction on the surface 13*b* of the mat member 10 becomes smaller in comparison to that of a mat member where no inorganic fiber bundles are formed.

For this reason, upon manufacturing a muffler by using the mat member 10 of this kind, by wrapping the inner pipe with the mat member 10 in such a manner as to place the surface 13*b* of the mat member 10 on the outer pipe side (outside) and then press-fitting the resulting inner pipe to the outer pipe, it becomes easier to reduce a frictional force between the surface 13*b* of the mat member 10 on which the inorganic fiber bundles 18 are formed and the inner face of the outer pipe.

Therefore, in the case where a muffler is manufactured by using the mat member according to the embodiment of the present invention, since the inner pipe wrapped with the mat member can more easily be press-fitted into the outer pipe, the mat member having a superior handling characteristics can more easily be provided.

As detailed above, in the case where the mat member according to the embodiment of the present invention is used for a muffler, since the interlayer strength of the entire mat member is improved, detachment of the inorganic fibers due to stress caused by flow of exhaust gases tends to be reduced, and thus it is possible to more easily prevent damages to the mat member due to wind erosion. Therefore, the noise reduction effect can more easily be maintained for a long period of time.

Moreover, in the case where a muffler is manufactured by using the mat member according to the embodiment of the present invention, since the inner pipe wrapped with the mat member can more easily be press-fitted into the outer pipe, the mat member having a superior handling characteristics can more easily be provided.

In the present specification, the mat member mainly containing inorganic fibers is defined as a mat member that contains about 60% by weight or more, preferably about 80% by weight or more of inorganic fibers. Here, in addition to inorganic fibers, the mat member may contain, for example, an organic binder, an inorganic binder, organic fibers, an organic film, metal fibers, vermiculite and the like. In the case where the organic binder or the like is contained in addition to the inorganic fibers, the inorganic fibers forming the mat member can be mutually bonded to one another more easily, as will be described later. As a result, dropping of the inorganic fibers from the mat material becomes less likely to occur.

In the mat member according to one embodiment of the present invention, the needle marks comprise: a first needle mark extending from a first needle penetration mark formed on a first surface of the mat member to a first needle protrusion mark formed on a second surface; and a second needle mark extending from a second needle penetration mark formed on the second surface of the mat member to a second needle protrusion mark formed on the first surface.

In the mat member according to the embodiment of the present invention, the directions of extension of the first needle marks and the second needle marks are made opposite to each other. That is, directions of entanglement of the inorganic fibers are made different from each other between the vicinity of each of the first needle marks and the vicinity of each of the second needle marks so that the inorganic fibers are entangled with one another more complicatedly over the entire mat member.

Therefore, in the mat member according to the embodiment of the present invention, the interlayer strength in the thickness direction is improved over the entire body of the mat member.

Consequently, in the case where the mat member according to the embodiment of the present invention is used for a muffler, since detachment of the inorganic fibers due to stress caused by flow of exhaust gases tends to be further reduced, it is possible to more easily prevent damages to the mat member due to wind erosion from occurring in an efficient manner.

In the mat member according to one embodiment of the present invention, an area density of a second inorganic fiber bundle formed on the first surface and an area density of a first inorganic fiber bundle formed on the second surface are different from each other.

Here, it is considered that the strength of a surface portion of the mat member containing the inorganic fiber bundles is lower than the strength of the other portions in which no inorganic fiber bundles are formed. For this reason, in the case where, upon using the mat member for a muffler, the portion containing the inorganic fiber bundles on the surface of the mat member is exposed from the small holes of the inner pipe, and subjected to a stress due to flow of exhaust gases, wind erosion may occur on the surface of the mat member. Therefore, in order to prevent damages to the surface of the mat member due to wind erosion, preferably the inorganic fiber bundles are not formed on the surface of the mat member to be placed on the side of the inner pipe (inside).

On the other hand, in order to more efficiently prevent the occurrence of damages to the entire mat member due to wind erosion, it is preferable to further increase the interlayer strength of the entire mat member by forming the first needle marks and the second needle marks having mutually different extension directions. In this case, the inorganic fiber bundles are formed on both of the first and second surfaces of the mat member.

In the mat member according to the embodiment of the present invention, since a first surface and a second surface that have mutually different forming densities of the inorganic fiber bundles are prepared, the above-mentioned objects that are contrary to each other can be achieved.

That is, in the case where the mat member according to the embodiment of the present invention is used for a muffler, by placing the surface bearing a large number of inorganic fiber bundles on the outer pipe side (outside), with the surface bearing fewer inorganic fiber bundles placed on the inner pipe side (inside), it becomes easier to further increase the interlayer strength of the entire mat member, while detachment of the inorganic fibers from the surface of the mat member is more easily suppressed to a minimum level on the surface of the mat member placed on the inner pipe side. Consequently, it is possible to more easily prevent damages to the mat member due to wind erosion from occurring in an efficient manner.

In the mat material according to one embodiment of the present invention, an average fiber diameter of the inorganic fibers is at least about 3 μm and at most about 10 μm.

When the average fiber diameter of the inorganic fibers is about 3 μm or more, the strength of the inorganic fibers themselves may not be easily lowered, and thus the interlayer strength of the entire mat member tends not to be reduced.

In the case where the average fiber diameter of the inorganic fibers is about 10 μm or less, the surface area of the inorganic fibers tends not to be smaller, and thus degradation of the sound-absorbing characteristic of the mat member tends not to be reduced. Moreover, since the number of the inorganic fibers forming the mat member per unit volume tends to not be smaller, the number of the inorganic fibers that are entangled with one another at each of the needle marks or the vicinity of each of the needle marks becomes less likely to be small, and thus the interlayer strength of the entire mat member tends not to be reduced.

Since the average fiber diameter of the inorganic fibers is set within the above-mentioned range in the mat member according to the embodiment of the present invention, a mat member having even higher interlayer strength as a whole can be obtained.

Therefore, in the case where the mat member according to the embodiment of the present invention is used for a muffler, since detachment of the inorganic fibers due to stress caused by flow of exhaust gases becomes much less likely to occur, it is possible to even more easily prevent damages to the mat member due to wind erosion from occurring in an efficient manner.

In the mat member according to one embodiment of the present invention, the area density of the needle marks is at least about 7 pcs/cm$^2$ and at most about 30 pcs/cm$^2$.

In the case where the area density of the needle marks is at least about 7 pcs/cm$^2$ and at most about 30 pcs/cm$^2$, since it becomes easier to sufficiently provide the needle marks formed per unit area, the interlayer strength of the entire mat member can more easily be increased. Moreover, since it becomes easier to sufficiently ensure the amount of the inorganic fiber bundles formed on the surface of the mat member, the coefficient of friction on the surface of the mat member bearing the inorganic fiber bundles is more easily reduced. For this reason, upon press-fitting the inner pipe wrapped with the mat member into the outer pipe, it is possible to more easily reduce a frictional force exerted between the surface of the mat member and the inner face of the outer pipe.

Moreover, since the inorganic fiber precursors are hardly shredded finely in the needle punching, it is possible to more easily ensure the strength of the inorganic fibers themselves sufficiently. Therefore, the interlayer strength of the entire mat member can more easily be increased.

In the mat member according to the embodiment of the present invention, since the area density of the needle marks is set within the above-mentioned range, it is possible to more easily provide a mat member having extremely high interlayer strength as a whole.

Consequently, in the case where the mat member according to the embodiment of the present invention is used for a muffler, since detachment of the inorganic fibers due to stress caused by flow of exhaust gases tends to be greatly reduced, it becomes easier to extremely efficiently prevent damages to the mat member due to wind erosion.

Moreover, in the mat member according to the embodiment of the present invention, since the area density of the needle marks is set within the range, upon manufacturing a muffler by using the mat member according to the embodiment of the present invention, it becomes easier to further reduce a frictional force exerted between the surface of the mat member and the inner face of the outer pipe. Therefore, since the inner pipe wrapped with the mat member can more easily be press-fitted into the outer pipe, the mat member having a superior handling characteristics can more easily be provided.

In the mat member according to one embodiment of the present invention, the above-mentioned inorganic fibers are inorganic fibers containing at least one material selected from alumina and silica.

In the mat member according to the embodiment of the present invention, the inorganic fibers to form the mat member are inorganic fibers containing at least one of alumina and silica so that they are superior in heat resistance.

Therefore, even when a muffler that uses the mat member according to the embodiment of the present invention is placed in an exhaust path, the inorganic fibers are less likely to be lost due to melting. Consequently, even in the case where the distance between the internal combustion engine and the muffler is short and the temperature of the exhaust gases is as high as at least about 800° C. and at most about 850° C., it is possible to more easily maintain the effect of reducing noise over a long period of time.

In the mat member according to one embodiment of the present invention, the above-mentioned mat member further includes an organic binder.

In the mat member according to the embodiment of the present invention, since the inorganic fibers forming the mat member are bonded to one another by the organic binder, dropping of the inorganic fibers forming the mat member hardly occurs.

Therefore, in the case where a muffler is manufactured by using the mat member according to the embodiment of the present invention, dropping of the inorganic fibers is less likely to occur upon wrapping the mat member around the inner pipe. Thus, since the possibility of dropped inorganic fibers sticking to the skin of an operator can more easily be reduced, and since the operator is less likely to inhale the dropped and scattered inorganic fibers, it is possible to more easily provide a mat member that is very safe for the operator.

The method for manufacturing a mat member according to an embodiment of one present invention is a method including: spinning a spinning mixture containing at least an inorganic compound and an organic polymer to manufacture an inorganic fiber precursor;

compressing the inorganic fiber precursor to manufacture a sheet member;

carrying out needle punching on at least one of surfaces of the sheet member to manufacture a needle-punched body in which a bundle-shaped inorganic fiber precursor including the inorganic fiber precursor oriented in a closed loop configuration is formed on at least one of surfaces of the sheet member; and firing the needle-punched body so as to manufacture a mat member mainly containing inorganic fibers.

In accordance with the method for manufacturing a mat member according to the embodiment of the present invention, by performing the above-mentioned steps, it is possible to manufacture the mat member according to the embodiment of the present invention in a preferable manner.

In the method for manufacturing a mat member according to the embodiment of one present invention, the needle punching is carried out on both surfaces of the sheet member.

In the method for manufacturing a mat member according to the embodiment of the present invention, by performing the above-mentioned steps, it is possible to manufacture the mat member according to the embodiment of the present invention, in which the needle marks include: a first needle mark extending from a first needle penetration mark formed on a first surface of the mat member to a first needle protrusion mark formed on a second surface; and a second needle mark extending from a second needle penetration mark formed on the second surface of the mat member to a second needle protrusion mark formed on the first surface in a preferable manner.

In the method for manufacturing a mat member according to one embodiment of the present invention, the needle punching is carried out while the number of needles to penetrate the sheet member is changed between one of the surfaces of the sheet member and the other surface thereof.

In accordance with the method for manufacturing a mat member according to the embodiment of the present invention, by performing the above-mentioned steps, it is possible to manufacture the mat member in which an area density of a second inorganic fiber bundle formed on the first surface and an area density of a first inorganic fiber bundle formed on the second surface are different from each other in a preferable manner.

In the method for manufacturing a mat member according to one embodiment of the present invention, the needle punching is carried out while the number of times a needle is made to penetrate the sheet member is changed between one of the surfaces of the sheet member and the other surface thereof.

In accordance with the method for manufacturing a mat member according to the embodiment of the present invention, by performing the above-mentioned steps, it is also possible to manufacture the mat member in which an area density of a second inorganic fiber bundle formed on the first surface and an area density of a first inorganic fiber bundle formed on the second surface are different from each other in a preferable manner.

In the method for manufacturing a mat member according to one embodiment of the present invention, the inorganic fibers forming the mat member have an average fiber diameter of at least about 3 μm and at most about 10 μm.

In accordance with the method for manufacturing a mat member according to the embodiment of the present invention, by performing the above-mentioned steps, it is possible to manufacture the mat member in which the inorganic fibers have an average fiber diameter of at least about 3 μm and at most about 10 μm in a preferable manner.

In the method for manufacturing a mat member according to one embodiment of the present invention, the area density of the needle marks formed by the needle punching is at least about 7 pcs/cm$^2$ and at most about 30 pcs/cm$^2$.

In accordance with the method for manufacturing a mat member according to the embodiment of the present invention, by performing the above-mentioned steps, it is possible to manufacture the mat member in which the needle marks have an area density of at least about 7 pcs/cm$^2$ and at most about 30 pcs/cm$^2$ in a preferable manner.

In the method for manufacturing a mat member according to one embodiment of the present invention, the inorganic compound contains at least one material selected from an inorganic compound which is converted into alumina after firing, and an inorganic compound which is converted into silica after firing.

In accordance with the method for manufacturing a mat member according to the embodiment of the present invention, by performing the above-mentioned steps, it is possible to manufacture the mat member in which the inorganic fibers are inorganic fibers containing at least one material selected from alumina and silica in a preferable manner.

In the method for manufacturing a mat member according to one embodiment of the present invention, after firing the needle-punched body, the fired needle-punched body is further impregnated with an organic binder solution so as to manufacture an impregnated mat member, and the impregnated mat member is then dried.

In accordance with the method for manufacturing a mat member according to the embodiment of the present invention, by performing the above-mentioned steps, it is possible to manufacture the mat member further including an organic binder in a preferable manner.

The muffler according to an embodiment of the present invention is a muffler including:

an inner pipe having a plurality of small holes formed therein;

a mat member to be wrapped around a side surface of the inner pipe;

an outer pipe to install therein the inner pipe having the side surface wrapped with the mat member; and end portion members to be disposed at the two end portions of the outer pipe, wherein the mat member is the mat member according to according to the embodiments of the present invention.

In the muffler according to the embodiment of the present invention, a mat member that can more easily prevent damages due to wind erosion even when the muffler is used under high temperature conditions as a muffler of an automobile or the like, is installed between the inner pipe and the outer pipe.

Therefore, the muffler according to the embodiment of the present invention can more easily maintain the noise reduction effect over a long period of time. Moreover, the outside appearance of the outer pipe is less likely to be impaired.

The muffler according to one embodiment of the present invention is a muffler including:
an inner pipe having a plurality of small holes formed therein;
a mat member to be wrapped around a side surface of the inner pipe;
an outer pipe to install therein the inner pipe having the side surface wrapped with the mat member; and
end portion members to be disposed at the two end portions of the outer pipe, wherein the mat member is the mat member manufactured by the method for manufacturing a mat member according to the embodiments of the present invention.

In the muffler according to the embodiment of the present invention, a mat member that can easily prevent damages due to wind erosion even when the muffler is used under high temperature conditions as a muffler of an automobile or the like, is installed between the inner pipe and the outer pipe.

Therefore, the muffler according to the embodiment of the present invention can more easily maintain the noise reduction effect over a long period of time. Moreover, the outside appearance of the outer pipe is hardly impaired.

The method for manufacturing a muffler according to one embodiment of the present invention is a method including:
wrapping a side surface of an inner pipe having a plurality of small holes formed therein, with a mat member;
press-fitting the inner pipe having the side surface wrapped with the mat member, into an outer pipe to manufacture a press-fitted body;
disposing an end portion member to each of the two end portions of the outer pipe of the press-fitted body, and
securing the end portion members to the outer pipe of the press-fitted body, wherein the mat member is the mat member according to the embodiments of the present invention, and
the inner pipe is wrapped with the mat member in a manner that the surface of the mat member on which the inorganic fiber bundles are formed is provided on the outer pipe side.

According to the method for manufacturing a muffler according to the embodiment of the present invention, by performing the above-mentioned steps, it is possible to manufacture the muffler according to the embodiment of the present invention in a preferable manner.

Moreover, in the method for manufacturing a muffler according to the embodiment of the present invention, the mat member is wrapped around the inner pipe so that one of the surfaces thereof, which has the inorganic fiber bundles and thus has a smaller coefficient of friction, is placed on the outer pipe side.

As a result, even when the inner pipe wrapped with the mat member is press fitted into the outer pipe, the frictional force to be exerted between the surface of the mat member and the inner face of the outer pipe can more easily be reduced. Therefore, the inner pipe wrapped with the mat member can more easily be press fitted into the outer pipe.

Consequently, in accordance with the method for manufacturing a muffler according to the embodiment of the present invention, it is possible to efficiently manufacture the muffler according to the embodiment of the present invention.

Moreover, in the case where the mat member according to the embodiment of the present invention including an organic binder is used as a mat member, dropping of the inorganic fibers becomes less likely to occur upon performing the wrapping. Thus, since the possibility of dropped inorganic fibers sticking to the skin of an operator tends to be reduced, and since the operator is less likely to inhale the dropped and scattered inorganic fibers, it is possible to secure the safety of the operator.

The method for manufacturing a muffler according to one embodiment of the present invention is a method including:
wrapping a side surface of an inner pipe having a plurality of small holes formed therein, with a mat member;
press-fitting the inner pipe having the side surface wrapped with the mat member, into an outer pipe to manufacture a press-fitted body;
disposing an end portion member to each of the two end portions of the outer pipe of the press-fitted body, and
securing the end portion members to the outer pipe of the press-fitted body, wherein the mat member is the mat member manufactured by the method for manufacturing a mat member according to the embodiments of the present invention, and
the inner pipe is wrapped with the mat member in a manner that the surface of the mat member on which the inorganic fiber bundles are formed is provided on the outer pipe side.

In accordance with the method for manufacturing a muffler according to the embodiment of the present invention, by performing the above-mentioned steps, it is possible to manufacture the muffler according to the embodiment of the present invention in a preferable manner.

Moreover, in the method for manufacturing a muffler according to the embodiment of the present invention, the mat member is wrapped around the inner pipe so that one of the surfaces thereof, which has the inorganic fiber bundles and thus has a smaller coefficient of friction, is placed on the outer pipe side.

As a result, even when the inner pipe wrapped with the mat member is press fitted into the outer pipe, it is easier to reduce the frictional force to be exerted between the surface of the mat member and the inner face of the outer pipe. Therefore, the inner pipe wrapped with the mat member can more easily be press-fitted into the outer pipe.

Consequently, in accordance with the method for manufacturing a muffler according to the embodiment of the present invention, it is possible to efficiently manufacture the muffler according to the embodiment of the present invention.

Moreover, in the case where the mat member manufactured by the method for manufacturing a mat member according to the embodiment of the present invention is used as a mat member, dropping of the inorganic fibers becomes less likely to occur upon performing the wrapping. Thus, since the possibility of dropped inorganic fibers sticking to the skin of an operator tends to be reduced, and since the operator is less likely to inhale the dropped and scattered inorganic fibers, it is possible to secure the safety of the operator.

(First Embodiment)

Referring to FIGS. 2A and 2B, FIG. 3, FIG. 4, and FIGS. 5A and 5B, the following description will discuss a first embodiment as one of the embodiments of the present invention.

Figure 2A:
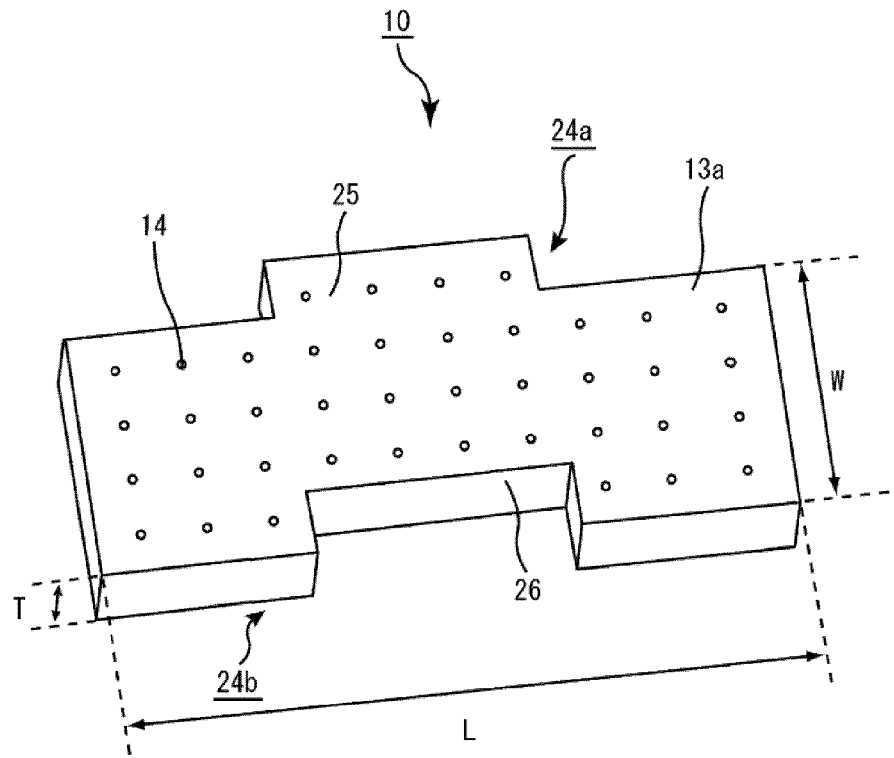
FIG. 2A is a perspective view that schematically shows one example of a mat member according to one embodiment of the present invention observed from one surface side.
Figure 2B:
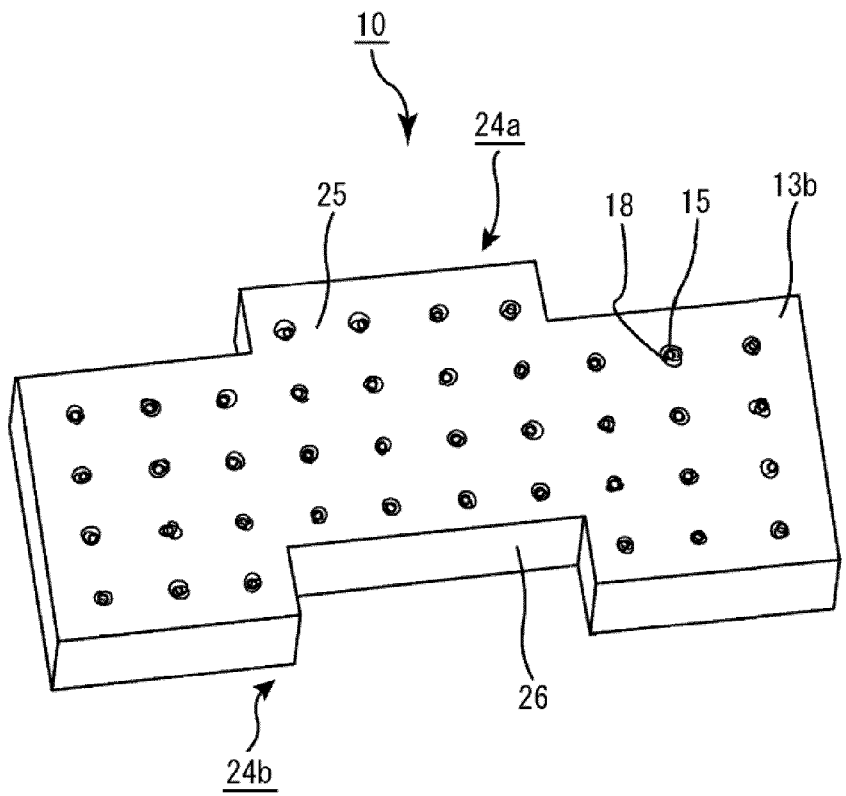
FIG. 2B is a perspective view that schematically shows the mat member shown in FIG. 2A observed from the other surface side.

FIG. 2A is a perspective view that schematically shows one example of a mat member of the present embodiment observed from one surface side, and FIG. 2B is a perspective view that schematically shows the mat member shown in FIG. 2A observed from the other surface side.

First, the structure of the mat member of the present embodiment will be explained.

A mat member 10 of the present embodiment is formed by including inorganic fibers mainly containing alumina and silica, that have an average fiber diameter of at least about 3 μm and at most about 10 μm. Here, as shown in FIGS. 2A and 2B, the outer shape of the mat member is a flat plate having predetermined length (indicated by an arrow L in FIG. 2A), width (indicated by an arrow W in FIG. 2A) and thickness (indicated by an arrow T in FIG. 2A), with a substantially rectangular shape in a plan view.

In the following explanation, a surface 13a of the mat member 10 is referred to also as an A surface, and a surface 13b on the side opposite to the A surface is referred to also as a B surface. Moreover, of end faces 24a and 24b parallel to the longitudinal direction of the mat member 10 (hereinafter, referred to also as long sides), a projected portion 25 is formed on one long side 24a and a recessed portion 26 is formed on the other long side 24b the recessed portion 26 having a shape to which the projected portion 25 is fitted when the mat member 10 is rolled up so that the long side 24a and the long side 24b are made in contact with each other.

Moreover, as shown in FIG. 2A, needle penetration marks 14, each formed by penetrating a needle into the mat member 10 by needle punching, are formed on the A surface 13a.

In contrast, as shown in FIG. 2B, a plurality of needle protrusion marks 15, each formed when the needle protrudes from the mat member 10 in the needle punching, are formed on the B surface 13b on the side opposite to the A surface 13a. Moreover, on each of the needle protrusion marks 15, an inorganic fiber bundle 18 which includes the inorganic fibers forming the mat member 10, oriented in a closed loop configuration, is formed.

Figure 3:
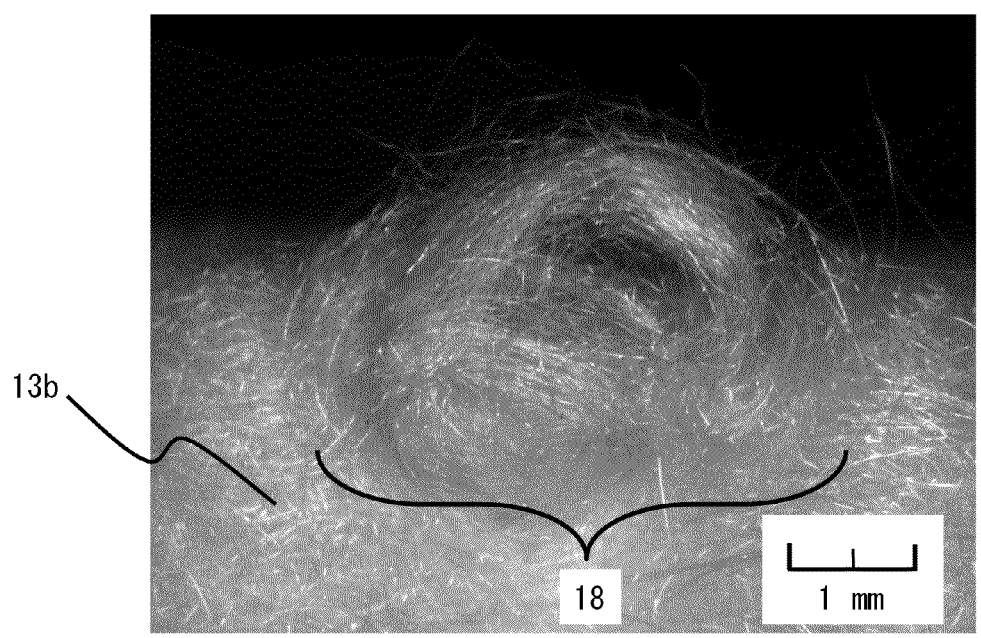
FIG. 3 is an optical microscopic photograph showing the inorganic fiber bundle formed on the needle protrusion mark on the surface of the mat member according to one embodiment of the present invention.

Referring to FIG. 3, the following description will discuss the shape of this inorganic fiber bundle 18.

FIG. 3 is an optical microscopic photograph showing the inorganic fiber bundle formed on the needle protrusion mark on the surface of the mat member of the present embodiment.

As shown in FIG. 3, the inorganic fiber bundle 18 has a closed loop configuration having a diameter of at least about 0.10 mm and at most about 10.0 mm, and formed on the B surface 13b with the inorganic fibers forming the mat member 10 oriented in the closed loop configuration.

The structure inside the mat member of the present embodiment is the same as the structure explained by reference to the above-mentioned FIG. 1A.

That is, a plurality of needle marks extending from the needle penetration marks to the needle protrusion marks are formed inside the mat member of the present embodiment, and the area density is at least about 7 pcs/cm$^2$ and at most about 30 pcs/cm$^2$. Here, in each of the needle marks and the vicinity of each of the needle marks, entanglement of the inorganic fibers occurs.

Moreover, the mat member of the present embodiment contains an organic binder that bonds the inorganic fibers with one another.

Here, the amount of the organic binder is suppressed to a minimum amount required for bonding the inorganic fibers with one another. For this reason, in the case where the mat member of the present embodiment is used for a muffler, the amount of organic components discharged from the muffler can be reduced, making it possible to avoid imposing loads on the environment.

Figure 4A:
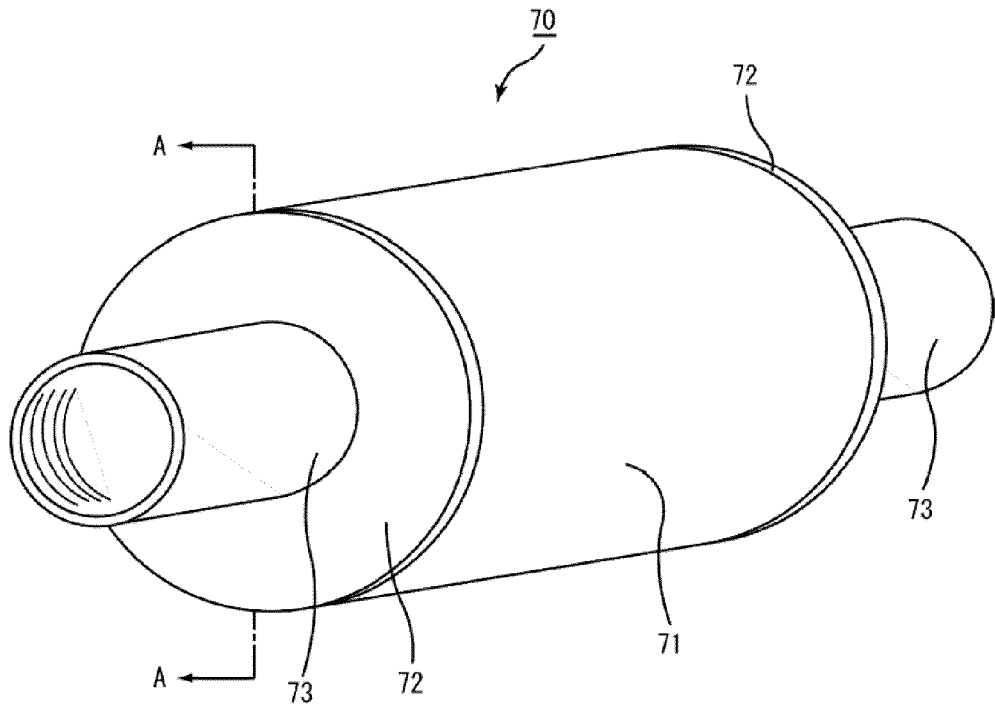
FIG. 4A is a perspective view that schematically shows one example of a muffler according to one embodiment of the present invention.
Figure 4B:
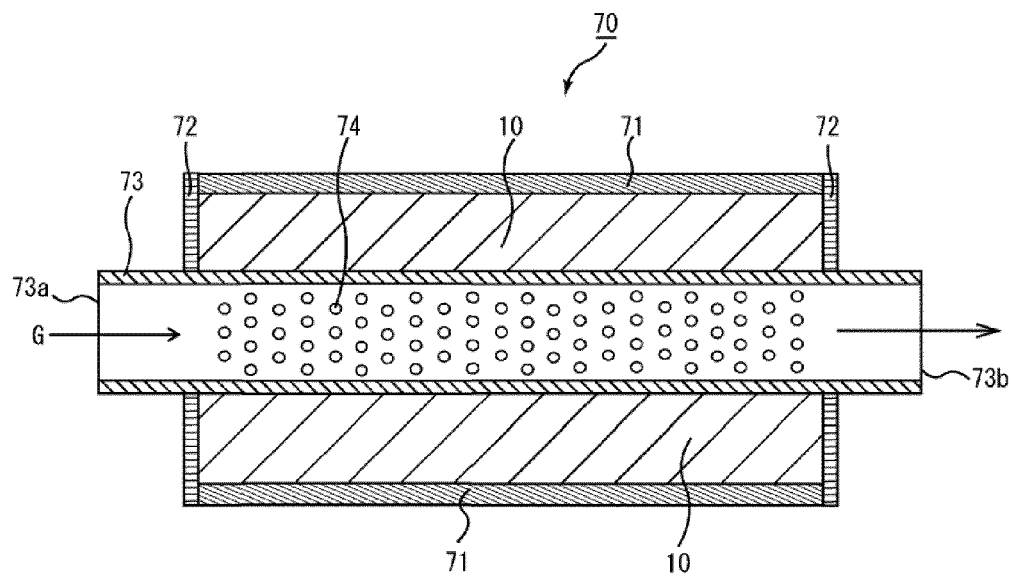
FIG. 4B is an A-A line cross-sectional view of the muffler shown in FIG. 4A.

Next, referring to FIGS. 4A and 4B, the following description will discuss the structure of the muffler of the present embodiment using the mat member of the present embodiment.

FIG. 4A is a perspective view that schematically shows one example of a muffler of the present embodiment, and FIG. 4B is an A-A line cross-sectional view of the muffler shown in FIG. 4A.

As shown in FIGS. 4A and 4B, a muffler 70 includes a cylindrical inner pipe 73 that forms a core portion, a cylindrical outer pipe 71 which covers a portion of the inner pipe 73 except for its two ends when the inner pipe 73 is placed therein, and end portion members 72 placed on the two end portions of the outer pipe 71, each of the members 72 having a through hole formed in the center through which the inner pipe 73 is placed. The size of the outer pipe 71 is designed such that the length is shorter than that of the inner pipe 73, and the inner diameter is larger than the outer diameter of the inner pipe 73.

Here, inside the outer pipe 71, a plurality of small holes 74 are formed in the inner pipe 73, and a mat member 10 is placed between the inner pipe 73 and the outer pipe 71.

As shown in FIG. 4B, in the muffler 70, exhaust gases, which are allowed to flow in from the inlet side 73a of the inner pipe 73 (in FIG. 4B, an arrow G indicates a flow of the exhaust gases), pass through the inner pipe 73 covered with the mat member 10 and the outer pipe 71, and are then discharged to outside from the outlet side 73b of the inner pipe 73.

In this case, noises, in particular, noises in a high-frequency range, are sound-absorbed and diffused by the small holes 74 formed in the inner pipe 73 and the mat member 10. As a result, those noises will be reduced.

Referring to FIGS. 5A, 5B, 5C, and 5D, the following description will discuss the respective members that form the muffler 70.

FIGS. 5A, 5B, 5C, and 5D are perspective views each schematically showing one example of a mat member, an inner pipe, an outer pipe and an end portion member, respectively, which form the muffler of the present embodiment.

Figure 5A:
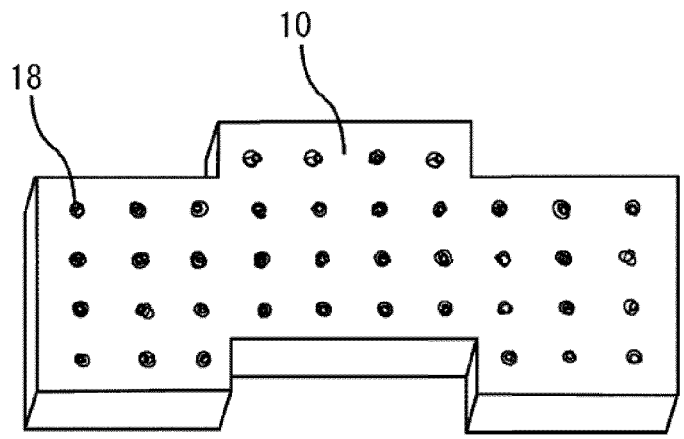
FIGS. 5A, 5B, 5C, and 5D are perspective views each schematically showing one example of a mat member, an inner pipe, an outer pipe and an end portion member, respectively, which form the muffler according to one embodiment of the present invention.

Here, since the structure of the mat member 10 of the present embodiment used for the muffler 70 shown in FIG. 5A has been already described, the explanation thereof will be omitted.

Figure 5B:
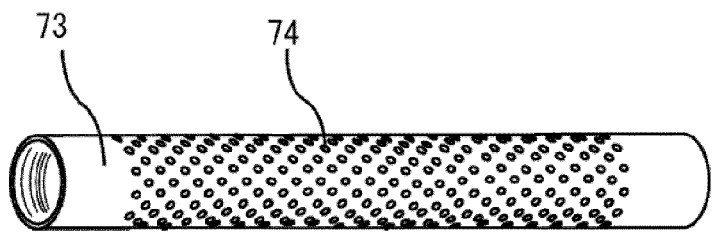

The inner pipe 73 shown in FIG. 5B is mainly made of metal such as stainless steel. Since the structure of the inner pipe 73 has been already described, the explanation thereof will be omitted.

Figure 5C:
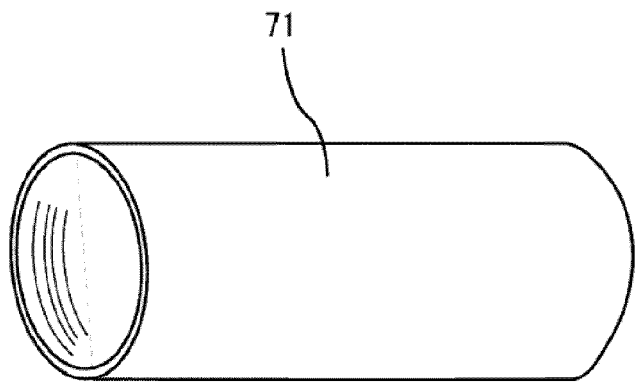

First, the following description will discuss the outer pipe 71. As shown in FIG. 5C, the outer pipe 71 is a cylindrical structure mainly made of metal such as stainless steel. The inner diameter of the outer pipe 71 is slightly smaller than the outer diameter of the mat member 10 in a state having been wrapped around the side surface of the inner pipe 73. The length thereof is shorter than that of the inner pipe 73.

Figure 5D:
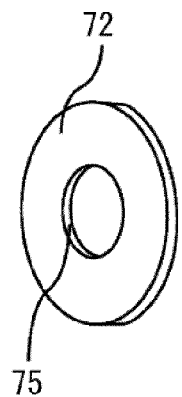

Next, the following description will discuss the end portion members 72. As shown in FIG. 5D, the end portion members 72 have a disc-like structure mainly made of metal such as stainless steel. The diameter thereof is substantially the same as the outer diameter of the outer pipe 71. A through hole 75 having substantially the same diameter as the outer diameter of the inner pipe 73 is formed approximately in the center portion of the end portion member 72.

The following description will discuss a method for manufacturing the mat member and the muffler of the present embodiment.

First, a method for manufacturing the mat member will be explained.

(1) Spinning

Silica sol is added to a basic aluminum chloride aqueous solution adjusted to have predetermined values of an Al content and a molecular ratio of Al and Cl so that a composition ratio of $Al_2O_3:SiO_2$ in inorganic fibers after firing falls in at least about (60:40) and at most about (80:20) (weight ratio). Moreover, a proper amount of an organic polymer is further added to improve the moldability.

The resulting mixed solution is condensed to form a spinning mixture, and this spinning mixture is spun by using a blowing method so that an inorganic fiber precursor having an average fiber diameter of at least about 3 µm and at most about 10 µm is manufactured.

In the present specification, the blowing method refers to a method in which the inorganic fiber precursor is spun by supplying the spinning mixture, extruded from a spinning mixture supplying nozzle, into a high-speed gas flow (air flow) blown through an air nozzle.

(2) Compression

Next, the inorganic fiber precursor is compressed to manufacture a continuous sheet member having a predetermined size.

(3) Needle Punching

A needle board to which needles are attached at a density of at least about 7 pcs/cm$^2$ and at most about 30 pcs/cm$^2$ is placed above one of the surfaces of the sheet member. A needle punching is carried out by allowing the needle board to descend and ascend once along the thickness direction of the sheet member so that a needle-punched body is manufactured. Upon the needle punching, each needle is allowed to penetrate the sheet member until a barb formed on the tip of the needle has completely protruded from the opposite surface of the sheet member.

A needle penetration mark is formed at the site where the needle is penetrated on the surface of the needle-punched body obtained by the needle punching, and moreover, a needle protrusion mark is formed at the site where the needle is protruded from the surface of the needle-punched body. Here, at each of the needle protrusion marks, a bundle-shaped inorganic fiber precursor formed by the inorganic fiber precursor oriented in a closed loop configuration is formed.

(4) Firing

Successively, the needle-punched body is continuously fired at a maximum temperature of at least about 1000° C. and at most about 1600° C. so that a fired sheet member is manufactured.

(5) First Cutting

Next, the fired sheet member is cut to manufacture a cut-off sheet member having a predetermined size.

(6) Impregnation

The cut-off sheet member is flow-coated with an organic binder solution so that the cut-off sheet member is impregnated with the inorganic binder; thus, an impregnated sheet member is manufactured.

(7) Drying

After an excessive organic binder solution has been removed by suction from the impregnated sheet member, the resulting sheet member is dried under pressure so that a dried sheet member containing the inorganic binder is manufactured.

(8) Second Cutting

The dried sheet member is cut to manufacture a mat member having a predetermined size and mainly containing inorganic fibers, in which a recessed portion is formed on one of its long sides and a projected portion is formed on the other long side in a shape to be fitted to the recessed portion.

The mat member of the present embodiment is manufactured through the processes mentioned above.

The thus manufactured mat member of the present embodiment forms a mat member which has a plurality of needle marks extending from the needle penetration marks formed on the A surface to the needle protrusion marks formed on the B surface. Moreover, on the B surface, the mat member has an inorganic fiber bundle configured by a plurality of inorganic fibers oriented in a closed loop configuration at each of the needle protrusion marks. The mat member further contains an organic binder.

Figure 6:
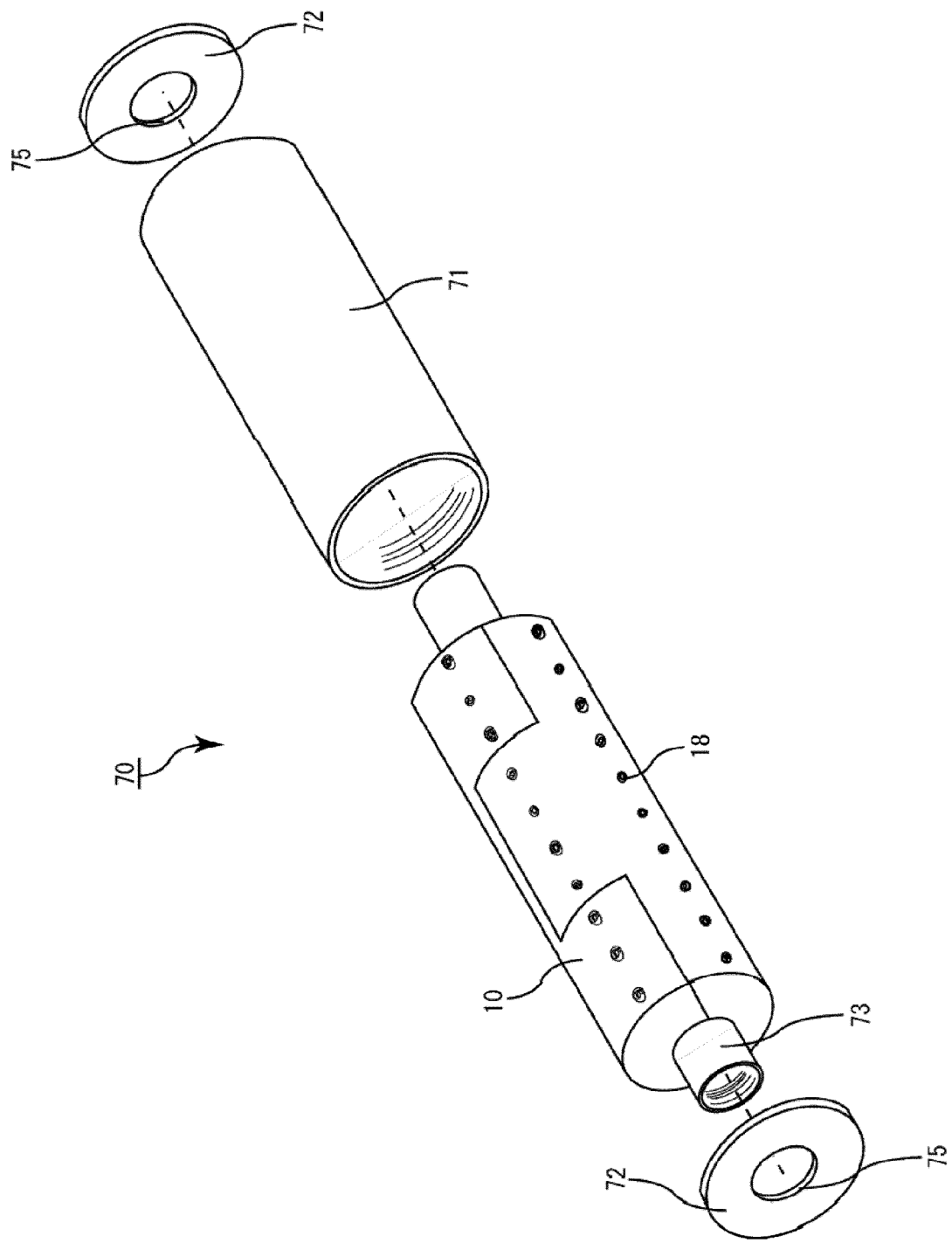
FIG. 6 is a perspective view that schematically shows process for manufacturing the muffler according to one embodiment of the present invention by using the inner pipe, mat member, outer pipe and end portion members respectively shown in FIGS. 5A, 5B, 5C, and 5D.

Referring to FIG. 6, the following description will discuss a method for manufacturing a muffler formed by using the mat member of the present embodiment.

FIG. 6 is a perspective view that schematically shows process for manufacturing a muffler by using the inner pipe, mat member, outer pipe and end portion members shown in FIGS. 5A, 5B, 5C, and 5D, respectively.

(1) Wrapping

A cylindrical inner pipe 73 having a plurality of small holes 74 thereon is prepared, and the side surface of the inner pipe 73 is wrapped with the mat member 10 of the present embodiment in such a manner that the B surface faces the outer pipe 71 (outside), and the A surface faces the inner pipe 73 (inside).

(2) Formation of Press-Fitted Body

The inner pipe 73 wrapped with the mat member 10 is press-fitted into the inside of the cylindrical outer pipe 71 so that a press-fitted body is manufactured.

(3) Fixation

First, two end portion members 72 are prepared. Then, the end portion members 72 are placed on the two ends of the outer pipe 71 in a manner that the inner pipe 73 placed therein as the press-fitted body is allowed to penetrate the through holes 75 of the respective end portion members 72. Next, the outer pipe 71 and the end portion members 72 are fixed to each other by using a fixing method such as welding, and the inner pipe 73 and the vicinity of the through hole 75 of each of the end portion members 72 are fixed by using a fixing method such as welding.

A muffler in which the press-fitted body is placed inside the outer pipe is manufactured through the processes mentioned above.

The following description will alternately discuss the function and effect of the mat member, the method for manufacturing the mat member, the muffler and the method for manufacturing the muffler in accordance with the first embodiment.

(1) The mat member of the present embodiment is provided with a plurality of needle marks, formed by needle-punching, which extend from needle penetration marks formed on a surface to needle protrusion marks formed on the surface on the side opposite to the side where the needle penetration marks are formed.

In the case where the mat member of the present embodiment having the above-mentioned structure is used for a muffler, since the interlayer strength of the entire mat member is increased, it becomes easier to prevent damages to the mat member caused by wind erosion. Consequently, it becomes easier to maintain the noise-reducing effect for a long period of time. Moreover, since the heat-insulating property of the mat member hardly deteriorates, the outside appearance of the outer pipe wrapped with the mat member becomes less likely to deteriorate.

(2) At each of the needle protrusion marks on the mat member of the present embodiment, an inorganic fiber bundle configured by a plurality of inorganic fibers oriented in a closed loop configuration is formed, and the inorganic fiber bundles are formed on at least one of the surfaces thereof.

In the case where a muffler is manufactured by using the mat member of the present embodiment having a kind of structure as mentioned above, by wrapping the inner pipe with the mat member, with the surface provided with the inorganic fiber bundles facing the outer pipe, the inner pipe wrapped with the mat member can more easily be press-fitted into the outer pipe. Therefore, it becomes easier to provide a mat member exerting superior handling characteristics.

(3) Moreover, in the case where a muffler is manufactured by using the mat member of the present embodiment having a kind of structure as mentioned above, since fluffs of the inorganic fibers forming the inorganic fiber bundles tend to be reduced, the possibility of inorganic fibers sticking to the skin of an operator tends to be reduced. Therefore, it becomes easier to provide a mat member that is very safe for the operator.

(4) In the mat member of the present embodiment, the inorganic fibers forming the mat member have an average fiber diameter of at least about 3 μm and at most about 10 μm. Moreover, the area density of the needle marks is set to at least about 7 pcs/cm$^2$ and at most about 30 pcs/cm$^2$. As a result, it becomes easier to provide a mat member having a higher interlayer strength as a whole.

Therefore, when the mat member of the present embodiment is used for a muffler, the noise reduction effect can more easily be maintained for a longer period of time.

(5) Moreover, as described above, in the mat member of the present embodiment, the area density of the needle marks is set to at least about 7 pcs/cm$^2$ and at most about 30 pcs/cm$^2$. Therefore, it becomes easier to further reduce a frictional force to be exerted between the surface of the mat member and the inner face of the outer pipe.

Thus, in the case where a muffler is manufactured by using the mat member of the present embodiment, the inner pipe wrapped with the mat member can more easily be press-fitted into the outer pipe, and it becomes easier to provide a mat member exerting superior handling characteristics.

(6) The mat member of the present embodiment includes inorganic fibers containing alumina and silica, and is thus superior in heat resistance. As a result, even when the muffler using the mat member of the present embodiment is placed in an exhaust path where a high-temperature exhaust gas passes through, melting loss of the inorganic fibers is less likely to occur.

Therefore, even when the temperature of exhaust gas becomes high, the noise reduction effect can more easily be maintained for a longer period.

(7) In the mat member of the present embodiment, the inorganic fibers forming the mat member are mutually bonded by an organic binder so that dropping of the inorganic fibers hardly occurs.

Therefore, in the case where a muffler is manufactured by using the mat member of the present embodiment, even upon carrying out wrapping or the like of the mat member onto the inner pipe, dropping of the inorganic fibers is less likely to occur, making it easier to provide a mat member that is very safe for the operator.

(8) According to the method for manufacturing a mat member of the present embodiment, by executing the above-mentioned processes, it is possible to desirably manufacture the mat member of the present embodiment.

(9) In the muffler of the present embodiment, the mat member of the present embodiment that can exert the above-mentioned functions and effects (1) to (7) is installed between the inner pipe and the outer pipe.

In particular, by utilizing the functions and effects of (1), (4) and (6) possessed by the mat member of the present embodiment, it becomes easier to maintain the noise reduction effect of the muffler of the present embodiment for a long period of time. Moreover, in the muffler, the outside appearance of the outer pipe is hardly impaired.

(10) In the method for manufacturing a muffler of the present embodiment, the muffler in accordance with the present embodiment is manufactured by using the mat member of the present embodiment that can exert the above-mentioned functions and effects of (2) and (5).

That is, in the method for manufacturing a muffler of the present embodiment, the inner pipe is wrapped with the mat member of the present embodiment in such a manner that the surface of the mat member which exerts a smaller coefficient of friction due to the inorganic fiber bundles formed thereon, among the surfaces of the mat member, faces the outer pipe. Moreover, the inner pipe wrapped with the mat member is press-fitted into the outer pipe so that the muffler of the present embodiment is manufactured. Thus, it becomes easier to reduce the frictional force to be exerted between the surface of the mat member and the inner face of the outer pipe. Therefore, the inner pipe wrapped with the mat member can more easily be press-fitted into the outer pipe.

Therefore, the method for manufacturing a muffler of the present embodiment makes it possible to efficiently manufacture the muffler of the present embodiment.

(11) According to the method for manufacturing a muffler of the present embodiment, the muffler of the present embodiment is manufactured by using the mat member of the present embodiment that can exert the function and effect described in the above (3).

That is, in the method for manufacturing a muffler of the present embodiment, the muffler is manufactured by using the mat member of the present embodiment in which respective inorganic fibers including inorganic fiber bundles are oriented in a closed loop configuration, with less fluffs of the inorganic fibers.

Moreover, in the method for manufacturing a muffler of the present embodiment, the muffler in accordance with the present embodiment is manufactured by using the mat member of the present embodiment that exerts the functions and effects described in the above (7).

That is, in the method for manufacturing a muffler of the present embodiment, the muffler is manufactured by using the mat member of the present embodiment in which, since the inorganic fibers are mutually bonded by an organic binder, dropping of the inorganic fibers hardly occurs.

Therefore, the method for manufacturing a muffler of the present embodiment makes it possible to ensure higher safety for the operator.

EXAMPLES

The following description will discuss examples that more specifically disclose the first embodiment of the present invention; however, the present embodiment is not intended to be limited only by these examples.

Example 1

1. Manufacturing of Mat Member

The mat member was manufactured by the following procedures.

(1-1) Spinning

To a basic aluminum chloride aqueous solution adjusted to have an Al content of 70 g/l and an atomic ratio of Al:Cl=1:1.8 was added silica sol in a manner that the inorganic fibers after firing was set to have a compound ratio of $Al_2O_3:SiO_2=72:28$ (weight ratio). Thereafter, a proper amount of an organic polymer (polyvinyl alcohol) was further added thereto to prepare a mixed solution.

The resulting mixed solution was condensed to form a spinning mixture, and this spinning mixture was spun by using a blowing method so that an inorganic fiber precursor having an average fiber diameter of 5.1 μm was manufactured.

(1-2) Compression

The inorganic fiber precursor obtained in the above process (1-1) was compressed to manufacture a continuous sheet member.

(1-3) Needle Punching

Continuous needle punching was performed on the sheet member obtained in the above process (1-2) under the following conditions to manufacture a needle-punched body.

First, a needle board to which needles were attached at a density of 21 pcs/cm$^2$ was prepared. Next, this needle board was placed above one of the surfaces of the sheet member, and needle punching was carried out by allowing the needle board to descend and ascend once along the thickness direction of the sheet member so that a needle-punched body was manufactured. On this occasion, each needle was made to penetrate the sheet member until a barb formed on the tip of the needle had completely protruded from the surface on the opposite side of the sheet member.

(1-4) Firing

The needle-punched body obtained in the above process (1-3) was continuously fired at a maximum temperature of 1250° C. so that a fired sheet member formed by inorganic fibers including alumina and silica was manufactured. It was found that, at each of the needle protrusion marks, a bundle of inorganic fibers including inorganic fibers oriented in a closed loop configuration was formed. The area density of inorganic fiber bundles was 21 pcs/cm$^2$.

Here, the average fiber diameter of the inorganic fibers was 5.1 μm, and the minimum value of the inorganic fiber diameter was 3.2 μm.

(1-5) First Cutting

The fired sheet member obtained in the above process (1-4) was cut to manufacture a cut-off sheet.

(1-6) Impregnation

The cut-off sheet member obtained in the above process (1-5) was flow-coated with an organic binder solution (acrylic latex) containing an acrylic resin serving as an organic binder so that the cut-off sheet member was impregnated with the organic binder; thus, an impregnated sheet member was manufactured.

(1-7) Drying

After an excessive organic binder solution had been removed by suction from the impregnated sheet member obtained in the above process (1-6), the resulting product was dried under pressure so that a dried sheet member containing the organic binder was manufactured. Here, the amount of the organic binder contained in the manufactured dried sheet member was 1% by weight.

(1-8) Second Cutting

The dried sheet member obtained in the above process (1-7) was cut to manufacture a mat member having a size of 239 mm in width×500 mm in length×7.4 mm in thickness; a needle mark-area density of 21 pcs/cm$^2$; a basis weight (weight per unit area) of 1240 g/m$^2$; and a density of 0.16 g/cm$^3$, in which a projected portion (represented by 25 in FIG. 2A) with a size of 50 mm in width (size of a portion in parallel with the width direction of the dried sheet member)×150 mm in length (size of a portion in parallel with the length direction of the dried sheet member) was formed on one portion of one of the long sides, and a recessed portion (represented by 26 in FIG. 2A) having a shape to be fitted to the projected portion was formed on one portion of the other long side.

Needle penetration marks were formed at portions on one of the surfaces of the thus manufactured mat member where the needles had penetrated. On the other hand, needle protrusion marks were formed at portions on the other surface of the mat member where the needles had protruded. Here, the needle marks were extended from the needle penetration marks to the needle protrusion marks (area density of the needle marks: 21 pcs/cm$^2$).

Moreover, it was found that at almost all the needle protrusion marks, inorganic fiber bundles, each including inorganic fibers that were oriented in a closed loop configuration, were formed.

With respect to the area density of the needle marks, the mat member was cut into two substantially equal portions to its thickness direction so that the number of visually observable needle marks per unit area on the cross section was calculated. Moreover, the presence or absence of the needle penetration marks, the needle protrusion marks and the inorganic fiber bundles was checked by visually observing the respective surfaces of the mat member.

2. Manufacturing of Muffler (2-1) Wrapping

First, a cylindrical inner pipe having a size of 70 mm in outer diameter (67 mm in inner diameter)×600 mm in length, with a plurality of small holes formed on its side surface, was prepared.

Next, the side surface of the inner pipe was wrapped with the mat member obtained in the above process (1-8) in such a manner that the surface (B surface) having the needle protrusion marks (inorganic fiber bundles) formed thereon faced outside and the surface (A surface) with the needle penetration marks formed thereon faced inside.

(2-2) Formation of Press-Fitted Body

The inner pipe wrapped with the mat member obtained in the above process (2-1) was press-fitted into the inside of a cylindrical outer pipe having a size of 82 mm in outer diameter (79 mm in inner diameter)×500 mm in length, so that a press-fitted body was manufactured.

(2-3) Fixation

First, two end portion members were prepared. Then, the end portion members were placed on the two ends of the outer pipe so that the inner pipe serving as the press-fitted body, obtained in the above process (2-2), was made to penetrate the through holes of the end portion members. Next, the outer pipe and the end portion members were fixed to each other by welding. Moreover, the inner pipe and the vicinity of the through hole of each of the end portion members were fixed to each other by welding.

A muffler in which the inner pipe with its side surface wrapped with the mat member was placed inside the outer pipe was manufactured through the processes mentioned above.

(Interlayer Strength-Measuring Test)

Figure 7A:
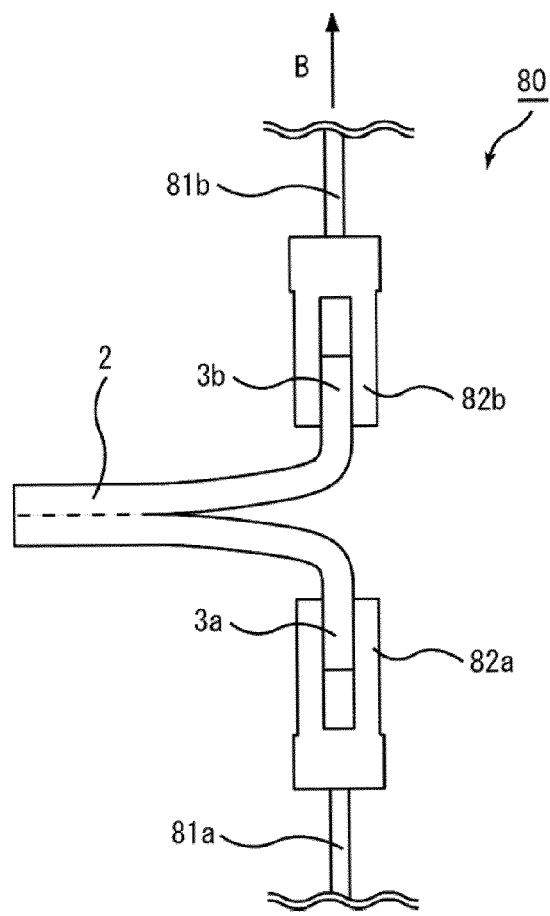
FIG. 7A is an explanatory drawing that shows the interlayer strength-measuring device.

An interlayer strength-measuring test was carried out by using an interlayer strength-measuring device 80 as shown in FIG. 7A.

Figure 7B:
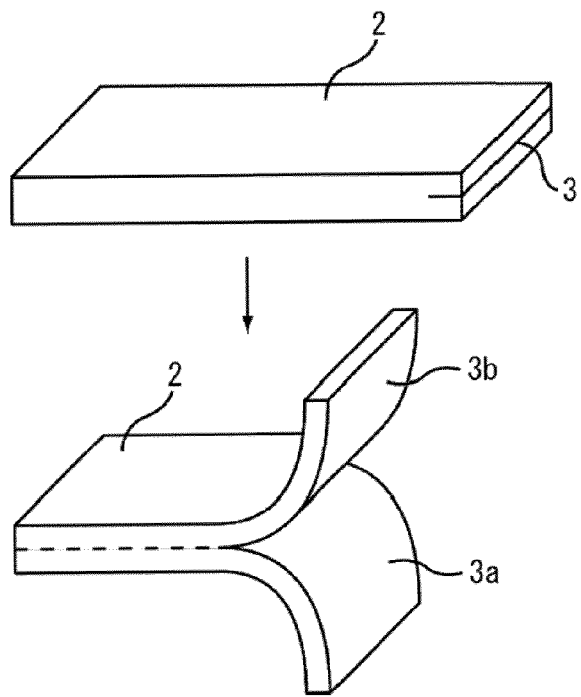
FIG. 7B is a perspective view that schematically shows the shape of a sample 2 for an interlayer strength measurement.

FIG. 7A is an explanatory drawing that shows the interlayer strength-measuring device, and FIG. 7B is a perspective view that schematically shows the shape of a sample 2 for an interlayer strength measurement.

As the interlayer strength-measuring device 80, an Instron universal material tester (5567made by Instron Corp.) was used. The interlayer strength-measuring device 80 includes a lower chuck 81a secured to the tester main body, not shown, and an upper chuck 81b that was allowed to move in a vertical direction. The lower chuck 81a and the upper chuck 81b respectively had grabbing portions 82a and 82b used for grabbing separated portions 3a and 3b of the sample 2.

The following description will discuss a testing method by using this interlayer strength-measuring device 80.

First, as shown in FIG. 7B, the mat member, manufactured in example 1 was cut off into a size of 50 mm in width×200 mm in length so that the sample 2 was prepared. Here, in order to eliminate the influences of an organic binder, the sample 2 was formed by using a mat member containing no organic binder, manufactured without carrying out the process (1-6) and the process (1-7).

Next, an incision 3 was made in one of the end faces of the sample 2 in the width direction by using a cutter so that the sample 2 was divided into two substantially equal portions in the thickness direction. Next, the sample 2 was separated apart by about 100 mm in the length direction along the incision 3 so that separated portions 3a and 3b were formed on one of the end faces of the sample 2 in the width direction.

One of the separated portions 3a of the separated portions 3a and 3b was grabbed by the grabbing portion 82a of the lower chuck 81a and the other separated portion 3b was grabbed by the grabbing portion 82b of the upper chuck 81b.

In this state, the upper chuck 81b was shifted upward in a vertical direction (a direction indicated by an arrow B in FIG. 7A) at a stretching rate of 10 mm/min so that the maximum load (N) required for completely separating the sample into two was measured. This measuring was executed three times, and the average value was defined as an interlayer strength of the entire mat member.

The result showed that the interlayer strength of the entire mat member manufactured in example 1 was 3.6 N.

(Measuring Test on Coefficient of Friction)

Figure 8:
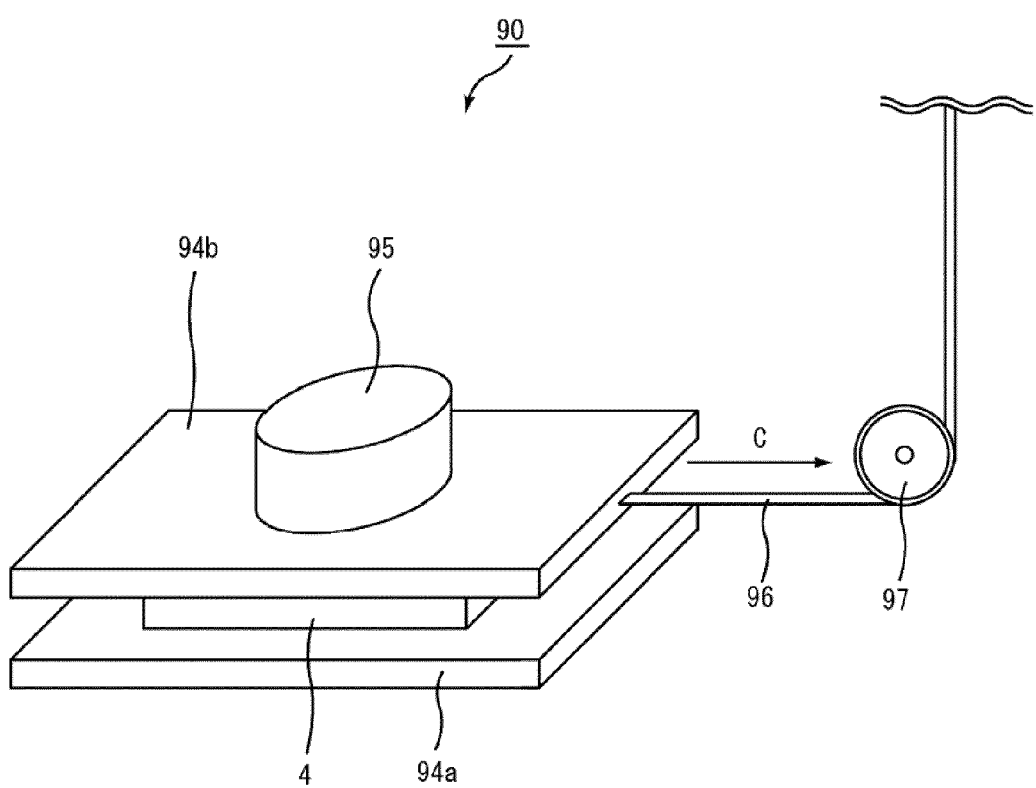
FIG. 8 is an explanatory drawing of the device for measuring coefficient of friction.

A measuring test on coefficient of friction was carried out by using a device for measuring coefficient of friction as shown in FIG. 8.

FIG. 8 is an explanatory drawing of the device for measuring coefficient of friction.

This measuring device 90 for coefficient of friction was configured by a lower plate member 94a and an upper plate member 94b both made of stainless steel, that sandwich a measuring sample 4 for coefficient of friction from upward and downward directions, a weight 95 placed on the upper face of the upper plate member 94b and a wire 96 that is connected to a load cell that shifts in a vertical direction of an Instron universal material tester, not shown. Here, the lower plate member 94a is secured to a base, not shown, so as not to move, and the wire 96 is coupled to the upper plate member 94b. This wire 96 connects the upper plate member 94b to the load cell through a pulley 97. Thus, in the case where the load cell is moved upward in the vertical direction, the upper plate member 94b is moved in a horizontal direction (direction indicated by arrow C in FIG. 8).

The test method using this measuring device 90 for coefficient of friction is explained as follows:

First, the mat member manufactured in example 1 was cut off into a size of 30 mm in width×50 mm in length so that a sample 4 for measuring the coefficient of friction was prepared.

Next, one of the surfaces of the sample 4 was secured on the fixed lower plate member 94a in a manner to make the length direction of the sample 4 in parallel with the shifting direction of the upper plate member 94b and the upper plate member 94b was placed on the other surface of the sample 4; thus, the sample 4 was sandwiched from upward and downward directions by the lower plate member 94a and the upper plate member 94b respectively. Then, a weight of 5 kg was placed on the upper face of the upper plate member 94b.

In this state, by shifting the load cell upward in the vertical direction at a stretching rate of 10 mm/min, the upper plate member 94b was moved in a horizontal direction at a moving rate of 10 mm/min. After a lapse of 120 seconds since the movement of the upper plate member 94b the stress was measured so that the coefficient of friction between the other surface of the sample 4 and the upper plate member 94b was calculated. The resulting coefficient of friction was defined as the coefficient of friction on the surface of the mat member.

Here, this measuring was carried out on each of the two surfaces of the mat member.

As a result, the coefficient of friction on the surface of the mat member manufactured in Example 1 was 0.25 on the A surface and 0.22 on the B surface.

Examples 2, 3 and Reference Examples 1, 2

A mat member and a muffler were manufactured in the same manner as in Example 1 except that, by altering the conditions for spinning the spinning mixture using the blowing method so as to set the average fiber diameter of the inorganic fibers forming the mat member in the process (1-1) of example 1 to the values as shown in Table 1 an inorganic fiber precursor having substantially the same average fiber diameter as the value shown in Table 1 was manufactured.

Examples 4, 5 and Reference Examples 3, 4

A mat member and a muffler were manufactured in the same manner as in Example 1 except that needle punching was carried out by using a needle board to which needles were attached in substantially the same density as the value shown in Table 1 so that the area density of needle marks on the mat member was set to the value shown in Table 1 in the process (1-3) of Example 1.

Comparative Example 1

A mat member and a muffler were manufactured in the same manner as in Example 1 except that the process (1-3) of Example 1 was not executed.

(Comparative Example 2

A mat member and a muffler were manufactured in the same manner as in Example 1 except that in the process (1-3) of Example 1 the needles were not allowed to protrude from the surface of the sheet member on the opposite side, by altering the protrusion depth of the needles in the needle punching.

In the mat members manufactured in these Comparative Examples 1 and 2 no inorganic fiber bundles were formed on the surface of each of the mat members.

The interlayer strength-measuring test and the measuring test for coefficient of friction were carried out in the same manner as in Example 1 on each of the mat members manufactured in Examples 2 to 5 Reference Examples 1 to 4 and Comparative Examples 1 and 2 so that the interlayer strength of the entire mat member and the coefficient of friction on the surface of the mat member were evaluated. The results of the respective Examples, Reference Examples and Comparative Examples are shown in Table 1 together with the results obtained in Example 1.

TABLE 1

| | Average fiber diameter (μm) | Presence or absence of needle punching | Needle marks-area density (pcs/cm²) | Presence or absence of inorganic fiber bundle A Surface | Presence or absence of inorganic fiber bundle B Surface | Interlayer strength (N) | Coefficient of friction A Surface | Coefficient of friction B Surface |
|---|---|---|---|---|---|---|---|---|
| Example 1 | 5.1 | Present (one surface) | 21 | Absent | Present | 3.6 | 0.25 | 0.22 |
| Example 2 | 3.0 | Present (one surface) | 21 | Absent | Present | 3.3 | 0.26 | 0.22 |
| Example 3 | 10.0 | Present (one surface) | 21 | Absent | Present | 3.2 | 0.25 | 0.20 |
| Example 4 | 5.1 | Present (one surface) | 8 | Absent | Present | 2.7 | 0.25 | 0.22 |
| Example 5 | 5.1 | Present (one surface) | 29 | Absent | Present | 3.7 | 0.25 | 0.20 |
| Reference Example 1 | 2.0 | Present (one surface) | 21 | Absent | Present | 3.2 | 0.24 | 0.21 |
| Reference Example 2 | 11.0 | Present (one surface) | 21 | Absent | Present | 2.9 | 0.25 | 0.20 |
| Reference Example 3 | 5.1 | Present (one surface) | 5 | Absent | Present | 2.1 | 0.26 | 0.25 |
| Reference Example 4 | 5.1 | Present (one surface) | 35 | Absent | Present | 3.2 | 0.25 | 0.20 |
| Comparative Example 1 | 5.1 | Absent | — | Absent | Absent | 0.01 | 0.26 | 0.26 |
| Comparative Example 2 | 5.1 | Present (one surface) (Note 1) | 21 (Note 2) | Absent | Absent | 0.2 | 0.26 | 0.26 |

(Note 1) Needle punching was carried out, but all the needles were arranged not to protrude from the opposite surface of the sheet member by changing the protrusion depth of the needles.
(Note 2) The area density (pcs/cm²) of needles formed on the needle board in the needle punching.

As a result, in each of the mat members manufactured in Examples 1 to 5 and Reference Examples 1 to 4 the interlayer strength of the entire mat member was made higher than those of the mat members manufactured in each of the Comparative Examples. For this reason, in the muffler which is made by using each of the mat members having the above-mentioned structure manufactured in Examples 1 to 5 and Reference Examples 1 to 4 it is considered that detachment of the inorganic fibers due to stress caused by flow of exhaust gases is less likely to occur as compared with the mat member manufactured in each of the Comparative Examples. Therefore, it is possible to more efficiently prevent damages to the mat member due to wind erosion from occurring.

Moreover, in the mat members manufactured in Examples 1 to 5 and Reference Examples 1 to 4 the coefficient of friction on the surface bearing inorganic fiber bundles was made lower than that of each of the mat members manufactured in the respective Comparative Examples. Therefore, it was possible to provide a mat member that was superior in handling characteristics.

In contrast, in the mat members manufactured in Comparative Examples 1 and 2, since no entangled inorganic fibers were generated, or since no entangled inorganic fibers were generated over the entire portion in the thickness direction of the mat member, the interlayer strength was low in both of the mat members. Moreover, since no inorganic fiber bundles were formed, the coefficient of friction was high on both of the two surfaces of the mat member.

Here, in the mat member manufactured in Reference Example 1 as in the mat member manufactured in each of the Examples, the interlayer strength of the entire mat member was greatly increased in comparison to that of the mat member manufactured in each of the Comparative Examples. However, the interlayer strength of the entire mat member was slightly lower than that of the mat member manufactured in Example 1. This is probably because the average fiber diameter of the inorganic fibers was less than 3 μm, causing a reduction in the strength of the inorganic fibers themselves.

In the mat member manufactured in Reference Example 2 as in the mat member manufactured in each of the Examples, the interlayer strength of the entire mat member was greatly increased in comparison to that of the mat member manufactured in each of the Comparative Examples. However, the interlayer strength of the entire mat member was slightly lower than that of the mat member manufactured in each of Examples 1 to 3. This is probably because the average fiber diameter of the inorganic fibers was more than 10 μm, causing a reduction in the number of inorganic fibers forming the mat member per unit volume, and thus fewer inorganic fibers entangled with one another.

In the mat member manufactured in Reference Example 3 as in the mat member manufactured in each of the Examples, the interlayer strength of the entire mat member was greatly increased in comparison to that of the mat member manufactured in each of the Comparative Examples. However, the interlayer strength of the entire mat member was slightly lower than that of the mat member manufactured in Example 1. This is probably because the area density of needle marks was less than 7 pcs/cm², namely, the density of the needle marks formed per unit area was small. Moreover, the coefficient of friction on the surface bearing the inorganic fiber bundles was slightly higher than that of the mat member manufactured in each of the Examples.

In the mat member manufactured in Reference Example 4 as in the mat member manufactured in each of the Examples, the interlayer strength of the entire mat member was greatly increased in comparison to that of the mat member manufactured in each of the Comparative Examples. However, the interlayer strength of the entire mat member was slightly lower than that of the mat member manufactured in Example 1. This is probably because the area density of the needle marks was more than 30 pcs/cm², and as a result portions of the inorganic fibers (inorganic fiber precursor) were finely shredded.

Accordingly, it was found that, although the mat members manufactured in Reference Examples 1 to 4 may also sufficiently exert the effects of the present embodiment, it was preferable that the inorganic fibers forming the mat member had an average fiber diameter in a range of 3 to 10 μm or that the area density of the needle marks was set in a range of 7 to 30 pcs/cm².

Moreover, it was found that the inorganic fibers forming the mat member more preferably have an average fiber diameter in a range of 3 to 10 μm and also the area density of the needle marks was more preferably set in a range of 7 to 30 pcs/cm².

(Second Embodiment)

Figure 9A:
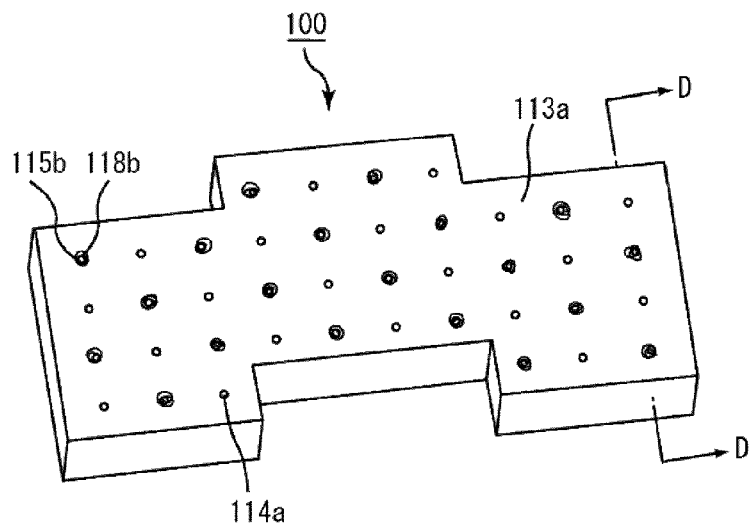
FIG. 9A is a perspective view that schematically shows a state in which one example of the mat member according to one embodiment of the present invention is observed from one surface side.
Figure 9B:
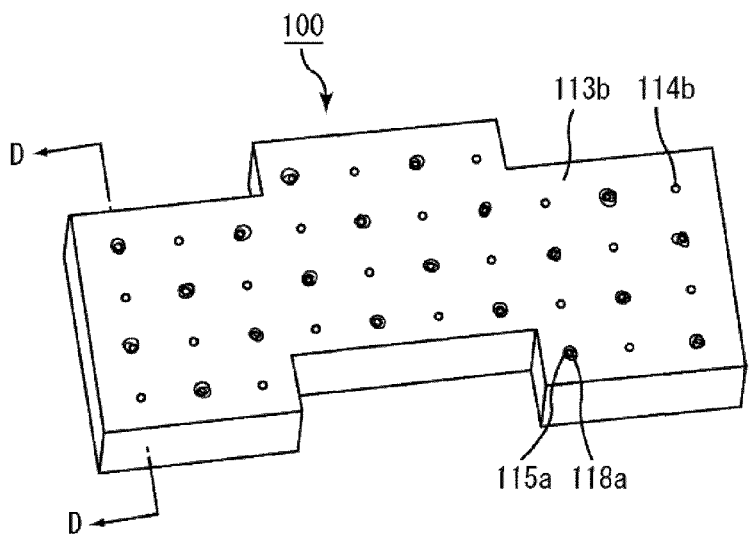
FIG. 9B is a perspective view that schematically shows a state in which the mat member shown in FIG. 9A is observed from the other surface side.
Figure 9C:
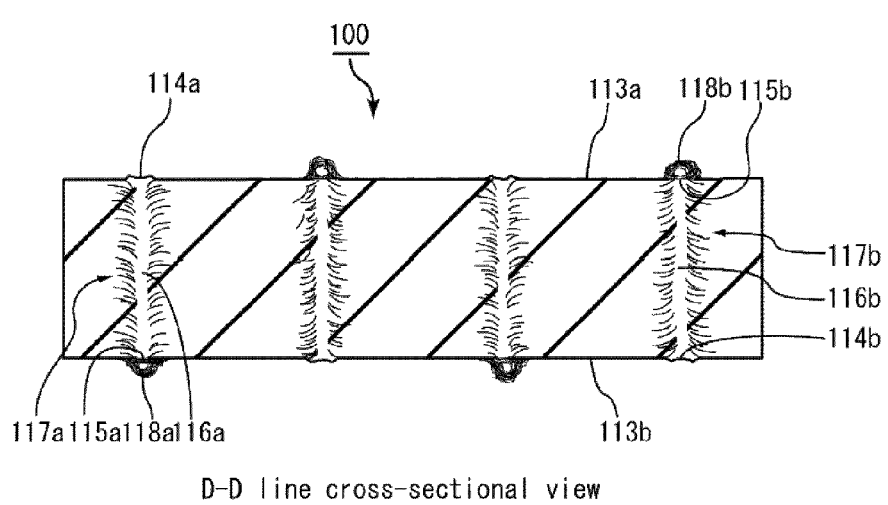
FIG. 9C is a D-D line cross-sectional view that schematically shows a cross section obtained when the mat member shown in FIG. 9A is cut in a direction perpendicular to the length direction of the mat member shown in FIG. 9A.

Referring to FIG. 9A, FIG. 9B and FIG. 9C, the following description will discuss a second embodiment as one of the embodiments of the present invention.

FIG. 9A is a perspective view that schematically shows a state in which one example of a mat member of the present embodiment is observed from one surface side, and FIG. 9B is a perspective view that schematically shows a state in which the mat member shown in FIG. 9A is observed from the other surface side. FIG. 9C is a D-D line cross-sectional view that schematically shows a cross section obtained when the mat member shown in FIG. 9A is cut in a direction perpendicular to the length direction of the mat member shown in FIG. 9A.

A mat member of the present embodiment includes inorganic fibers containing alumina and silica, and as shown in FIGS. 9A, 9B, and 9C, its outer shape is, in the same manner as the first embodiment, formed as a flat plate having a predetermined thickness, which has a substantially rectangular shape when viewed from above.

The other structures relating to the outer shape of the mat member of the present embodiment are the same as those of the first embodiment; therefore, the description thereof will be omitted.

As shown in FIGS. 9A, 9B, and 9C, first needle penetration marks 114a formed by needles that penetrate a surface 113a (hereinafter, referred to also as a first surface) of a mat member 100 of the present embodiment, are formed on the first surface 113a of the mat member 100.

Moreover, on a surface 113b on the side opposite to the first surface 113a (hereinafter, referred to also as a second surface) of the surfaces of the mat member 100, second needle penetration marks 114b are formed by needles that penetrate the second surface 113b of the mat member 100.

Furthermore, on the first surface 113a of the mat member 100, a plurality of second needle protrusion marks 115b are formed by needles protruded from the first surface 113a of the mat member 100 at positions corresponding to the needle penetration marks 114b formed on the second surface 113b. Moreover, a second inorganic fiber bundle 118b including inorganic fibers oriented in a closed loop configuration, forming the mat member 100, is formed on the second needle protrusion mark 115b.

Here, on the second surface 113b of the mat member 100, a plurality of first needle protrusion marks 115a are formed by needles protruded from the second surface 113b of the mat member 100 at positions corresponding to the needle penetration marks 114a formed on the first surface 113a. Moreover, a first inorganic fiber bundle 118a including inorganic fibers oriented in a closed loop configuration, forming the mat member 100, is 3 formed on the first needle protrusion marks 115a.

As shown in FIG. 9C, in the same manner as the above-mentioned structure of the first embodiment, the inner structure of the mat member 100 of the present embodiment is formed such that a plurality of first needle marks 116a extending from the first needle penetration marks 114a to the first needle protrusion marks 115a are formed, and entangled inorganic fibers are generated at the first needle marks 116a and at the vicinity 117a of the first needle marks 116a. Moreover, adjacent to the first needle marks 116aa plurality of second needle marks 116b extending from the second needle penetration marks 114b to the second needle protrusion marks 115b are formed, and also at the second needle marks 116b and the vicinity 117b of the second needle marks 116ben-tangled inorganic fibers are generated.

In this manner in the mat member 100 of the present embodiment, the directions of extension of the first needle marks 116a and the second needle marks 116b are opposed to each other. For this reason, direction of the entanglement of the inorganic fibers is different from each other between the first needle marks 116a as well as the vicinities 117a of the first needle marks and the second needle marks 116b as well as the vicinities 117b of the second needle marks, with the result that inorganic fibers of the mat member 100 are more complicatedly entangled as a whole.

The other structures of the mat member 100 of the present embodiment are the same as those structures of the mat member of the first embodiment, except that the area density of the total number of needle marks including the first needle marks 116a and the second needle marks 116b is set to at least about 7 pcs/cm$^2$ and at most about 30 pcs/cm$^2$. Here, the area density of the first needle marks 116a and the area density of the second needle marks 116b may be set to the same value, or may be set to values different from each other.

Moreover, the area density of the second inorganic fiber bundle 118b formed on the first surface 113a and the area density of the first inorganic fiber bundle 118a formed on the second surface 113b are different from each other.

The muffler of the present embodiment has the same structure as that of the muffler of the first embodiment, except that the mat member of the present embodiment is used.

The following description will discuss a method for manufacturing a mat member and a muffler in accordance with the present embodiment.

A method for manufacturing the mat member will be explained below.

First, a sheet member is manufactured by carrying out spinning and compression in the same manner as in the first embodiment.

Next, two needle boards to which needles are attached with different densities are prepared, and one of the needle boards is placed apart from the second surface of a sheet member. Moreover, by allowing the needle board to descend and ascend along the thickness direction of the sheet member, needle punching of the first time is carried out. Next, the other needle board is placed apart from the first surface of the sheet member, and by allowing the needle board to descend and ascend along the thickness direction of the sheet member, needle punching of the second time is carried out so that a needle-punched body is manufactured. In this case, with respect to the two faces of the sheet member, each of the needles is allowed to completely penetrate until a barb formed on the tip of the needle has completely protruded from the surface on the opposite side of the sheet member.

Moreover, depending on the needle-area density, two needle boards to which needles are attached with the same density may be used as the needle boards. With the use of such needle boards, it is also possible to manufacture a needle-punched body in which the area density of the second inorganic fiber bundle formed on the first surface and the area density of the first inorganic fiber bundle formed on the second surface are different from each other by carrying out the above-mentioned processes.

The reason for this is presumably because, by carrying out needle punching of the second time on the first surface where the bundle-shaped inorganic fiber precursors have been once formed, some of the bundle-shaped inorganic fiber precursors formed on the first surface are again wound in the needle-punched body by the needles so that some of the bundle-shaped inorganic fiber precursors formed on the first surface are lost. Consequently, in order to manufacture a needle-punched body in which the area density of the second inorganic fiber bundle formed on the first surface and the area density of the first inorganic fiber bundle formed on the second surface are different from each other, it is preferable to use needle boards that have a high needle-area density to a certain degree. In the case where the needle-area density is too low, in the needle punching of the second time, the needles are made to penetrate at positions apart from the bundle-shaped inorganic fiber precursors formed on the first surface. Consequently, the bundle-shaped inorganic fiber precursors previously formed are hardly wound in the needle-punched body by the needles.

As described above, in order to manufacture a needle-punched body in which the area density of the second inorganic fiber bundle formed on the first surface and the area density of the first inorganic fiber bundle formed on the second surface are different from each other, two needle boards to which needles are attached with mutually different densities may be used, or depending on the needle-area density, two needle boards to which needles are attached with the same density may be used.

A mat member of the present embodiment is manufactured by performing firing, first cutting, impregnation, drying, and second cutting, on the resulting needle-punched body in the same manner as the first embodiment.

In a method for manufacturing a muffler in accordance with the present embodiment, the same processes as those of the method for manufacturing a muffler of the first embodiment are carried out to manufacture the muffler of the present embodiment, except that, of the first and second surfaces of the mat member of the present embodiment, the surface bearing more inorganic fiber bundles is placed on the outer pipe side (outside), and the surface bearing fewer inorganic fiber bundles is placed on the inner pipe side (inside).

The above-mentioned second embodiment can also exert the functions and effects of the above (1) to (11) explained in the first embodiment.

Moreover, the following functions and effects are also exerted.

(12) In the mat member of the present embodiment, the first needle marks and the second needle marks, which have directions of extension of the needle marks mutually opposing to each other, are formed.

For this reason, it becomes easier to provide a mat member having higher interlayer strength as a whole.

Therefore, when the mat member of the present embodiment is used in a muffler, it becomes easier to maintain the noise reduction effect for a longer period of time.

(13) In the muffler of the present embodiment, the mat member of the present embodiment capable of exerting the functions and effects of (12) is installed between the inner pipe and the outer pipe.

Therefore, the muffler of the present embodiment makes it easier to maintain the noise reduction effect over a longer period. Moreover, the outside appearance of the outer pipe is far less likely to be deteriorated.

(14) In the mat member of the present embodiment, the area density of the second inorganic fiber bundle formed on the first surface and the area density of the first inorganic fiber bundle formed on the second surface are different from each other.

Therefore, upon manufacturing a muffler by using the mat member of the present embodiment, of the first and second surfaces of the mat member of the present embodiment, the surface bearing more inorganic fiber bundles can be placed on the outer pipe side (outside), and the surface bearing fewer inorganic fiber bundles can be placed on the inner pipe side (inside) that is on the side opposite thereto. As a result, it becomes easier to further increase the interlayer strength of the entire mat member, while detachment of the inorganic fibers due to stress caused by flow of exhaust gases is more easily suppressed to a minimum level on the surface of the mat member placed on the inner pipe side. Moreover, it becomes easier to easily press-fit the inner pipe wrapped with the mat member to the outer pipe.

Consequently, the application of the mat member of the present embodiment to a muffler makes it easier to maintain the noise reduction effect over a further longer period. Moreover, it becomes easier to provide a mat member having superior handling characteristics upon manufacturing a muffler.

(15) In the muffler of the present embodiment, since the mat member of the present embodiment capable of exerting the functions and effects of (14) is installed between the inner pipe and the outer pipe, it becomes easier to maintain the noise reduction effect over a further longer period. Moreover, the outside appearance of the outer pipe is far less likely to be deteriorated.

The following description will discuss examples that more specifically disclose the second embodiment of the present invention. It is to be noted that the second embodiment is not limited to these examples.

A mat member and a muffler were manufactured in the same manner as in Example 1 except that a needle-punched body was manufactured by carrying out needle punching on a sheet member under the following conditions in the process (1-3) of Example 1.

First, two needle boards to which needles were attached at a density of 10 pcs/cm$^2$ were prepared. Next, one of the needle boards was placed apart from the second surface of a sheet member. Moreover, by allowing the needle board to descend and ascend once along the thickness direction of the sheet member, first needle punching was performed. Next, the other needle board was placed apart from the first surface of the sheet member, and by allowing the needle board to descend and ascend once along the thickness direction of the sheet member, needle punching of the second time was performed so that a needle-punched body was manufactured. In this case, each of the needles was allowed to completely penetrate until a barb formed on the tip of the needle had completely protruded from the surface on the opposite side of the sheet member.

At portions on the first surface of the mat member manufactured by using the above-mentioned needle-punched body where the needles had penetrated, first needle penetration marks were formed. Moreover, at portions on the second surface of the mat member where the needles had protruded, first needle protrusion marks were formed. It was found that at the first needle protrusion marks, inorganic fiber bundles, each including inorganic fibers that were oriented in a closed loop configuration, were formed.

Moreover, at portions on the second surface of the mat member thus obtained where the needles had penetrated, second needle penetration marks were formed. Moreover, at portions on the first surface of the mat member where the needles had protruded, second needle protrusion marks were formed. It was found that at the second needle protrusion marks, inorganic fiber bundles, each including inorganic fibers that were oriented in a closed loop configuration, were formed.

The area density of the second inorganic fiber bundles formed on the first surface was 2 pcs/cm$^2$, and the area density of the first inorganic fiber bundles formed on the second surface was 7 pcs/cm$^2$. Moreover, the area density of the total needle marks including the first needle marks and the second needle marks was 20 pcs/cm².

Here, the area density of the first inorganic fiber bundles and the area density of the second inorganic fiber bundles were measured by visually observing the number of inorganic fiber bundles present per unit area on each of the surfaces of the mat member.

In the mat member thus manufactured, the area density of the inorganic fiber bundles was slightly lower than the area density of the needle marks. The reason for this is presumably because, as described earlier, when needle punching is again carried out from the first surface side where bundle-shaped organic fiber precursors had been already formed, some of the bundle-shaped inorganic fiber precursors formed on the first surface were wound in the needle-punched body.

Examples 7, 8

A mat member and a muffler were manufactured in the same manner as those in Example 6 except that, by altering the conditions for spinning a spinning mixture by the blowing method so that the average fiber diameter of inorganic fibers forming a mat member was set to values shown in Table 2 inorganic fiber precursors each having substantially the same average fiber diameter as the value shown in Table 2 were manufactured. The area density of the second inorganic fiber bundles formed on the first surface, the area density of the first inorganic fiber bundles formed on the second surface, and the area density of the total needle marks including the first needle marks and the second needle marks were the same as those of Example 6.

Examples 9, 10

A mat member and a muffler were manufactured in the same manner as in Example 6 except that needle punching was carried out by using two needle boards (Example 9), each having needles at a density of 7 pcs/cm², or two needle boards (Example 10), each having needles at a density of 14 pcs/cm².

In Example 9 the area density of the second inorganic fiber bundles formed on the first surface was one piece/cm², and the area density of the first inorganic fiber bundles formed on the second surface was 5 pcs/cm². Moreover, the area density of the total needle marks including the first needle marks and the second needle marks was 14 pcs/cm².

In Example 10 the area density of the second inorganic fiber bundles formed on the first surface was 2.5 pcs/cm², and the area density of the first inorganic fiber bundles formed on the second surface was 10 pcs/cm². Moreover, the area density of the total needle marks including the first needle marks and the second needle marks was 28 pcs/cm².

The interlayer strength-measuring test and the measuring test for coefficient of friction were carried out, in the same manner as in Example 1 on each of the mat members manufactured in Examples 6 to 10 so that the layer strength of the entire mat member and the coefficient of friction on the surface of the mat member were evaluated. The results of the respective Examples are shown in Table 2. Table 2 also shows the results of Comparative Examples 1 and 2 for reference.

TABLE 2

| | Average fiber diameter (μm) | Presence or absence of inorganic fiber bundle | | Interlayer strength (N) | Coefficient of friction | |
|---|---|---|---|---|---|---|
| | | First Surface | Second Surface | | First Surface | Second Surface |
| Example 6 | 5.1 | 2 | 7 | 3.6 | 0.25 | 0.22 |
| Example 7 | 3.0 | 2 | 7 | 3.3 | 0.25 | 0.23 |
| Example 8 | 10.0 | 2 | 7 | 3.2 | 0.25 | 0.21 |
| Example 9 | 5.1 | 1 | 5 | 3.2 | 0.26 | 0.23 |
| Example 10 | 5.1 | 2.5 | 10 | 3.8 | 0.25 | 0.22 |
| Comparative Example 1 | 5.1 | 0 | 0 | 0.01 | 0.26 | 0.26 |
| Comparative Example 2 | 5.1 | 0 | 0 | 0.20 | 0.26 | 0.26 |

As a result, in each of the mat members manufactured in Examples 6 to 10 the interlayer strength of the entire mat member was made higher than those of the mat members manufactured in Comparative Examples 1 and 2. Therefore, it is considered that detachment of the inorganic fibers due to stress caused by flow of exhaust gases tends not to occur in the muffler made by using each of the mat members manufactured in Examples 6 to 10 having the above-mentioned structure. Therefore, it becomes possible to efficiently prevent damages to the mat member due to wind erosion from occurring.

Moreover, in the mat members manufactured in Examples 6 to 10 the coefficient of friction, in particular, on the second surface of the surfaces of the mat member was made lower than that of each of the mat members manufactured in Comparative Examples 1 and 2. Therefore, it was possible to provide a mat member that has superior handling characteristics.

Furthermore, according to Examples 6 to 10 it was possible to manufacture mat members in which the first surface and the second surface have different forming densities of the inorganic fiber bundles.

Upon manufacturing a muffler by using each of the mat members of Examples 6 to 10 the second surface bearing more inorganic fiber bundles can be placed on the outer pipe side (outside), with the first surface bearing fewer inorganic fiber bundles placed on the inner pipe side (inside).

Therefore, in the mufflers manufactured by using the mat members of Examples 6 to 10 it is considered to be possible to more efficiently prevent damages to the mat member due to wind erosion, while suppressing detachment of the inorganic fibers due to stress caused by flow of exhaust gases to a minimum level.

(Other Embodiments)

In the mat member according to the embodiments of the present invention, the area density of the second inorganic fiber bundles formed on the first surface and the area density of the first inorganic fiber bundles formed on the second surface may be made equal to each other. A mat member of this kind can exert the functions and effects described in the above (1) to (13) among the above-mentioned functions and effects of the mat member according to the embodiments of the present invention.

Although not particularly limited, the size of the mat member according to the embodiments of the present invention is determined by the sizes of the inner pipe and the outer pipe to be used for the muffler according to the embodiments of the present invention. However, when the mat member is used for a muffler, the size thereof is preferably such that a gap is not formed between the side surface of the inner pipe and the outer pipe. This is because, in a state where a gap is not formed between the side surface of the inner pipe and the outer pipe, the temperature of the portion of the outer pipe tends not to rise, with the result that discoloration tends not to occur due to heat. Thus, degradation of the outside appearance of the outer pipe becomes less likely to occur.

The inorganic fibers forming the mat member according to the embodiments of the present invention is not limited to the above-mentioned inorganic fibers containing alumina and silica, and may be an inorganic fiber containing other inorganic compounds.

Moreover, the inorganic fibers may contain only alumina, or may contain only silica, out of alumina and silica.

The compounding ratio of the inorganic fibers containing alumina and silica is preferably set to $Al_2O_3:SiO_2$ of at least about (60:40) and at most about (80:20), and is more preferably set to $Al_2O_3:SiO_2$ of at least about (70:30) and at most about (74:26), in weight ratios.

The inorganic fibers, which contain only alumina out of alumina and silica, may contain an additive such as CaO, MgO and $ZrO_2$, in addition to alumina.

The inorganic fibers, which contain only silica out of alumina and silica, may contain an additive such as CaO, MgO and $ZrO_2$, in addition to silica.

The average fiber length of the inorganic fibers forming the mat member according to the embodiments of the present invention is preferably set to about 250 μm or more, and is more preferably set to about 500 μm or more. This is because, the average fiber length of about 250 μm or more is not too short for the fiber length of the inorganic fibers forming the mat member, and thus a reduction in the interlayer strength of the entire mat member is less likely to occur.

The upper limit value of the average fiber length of the inorganic fibers is not particularly limited, because the inorganic fiber is obtained in a shape where the inorganic fiber precursors are continuously spun.

The shapes of the recessed portion and the projected portion formed on the long sides of the mat member according to the embodiments of the present invention are not particularly limited, as long as the recessed portion and the projected portion are allowed to fit each other. In the case where the mat member is formed by one pair of the recessed portion and the projected portion, it is preferable that a projected portion with a size of at least about 10 mm in width×10 mm in length and at most about 80 mm in width×200 mm in length is protrudingly formed on one portion of one of the long sides, and a recessed portion having a shape to fit the protrusion portion is formed on one portion of the other long side. Upon manufacturing a muffler by using a mat member including the recessed portion and the projected portion each having the above-mentioned shape, since the mat member can be assuredly wrapped around the inner pipe more easily, it becomes easier to provide superior handling characteristics.

Moreover, on the long sides of the mat member, a plurality of recessed portions and projected portions that are fitted to each other may be formed, or the recessed portion and the projected portion need not be formed.

In the mat member according to the embodiments of the present invention, the size of the inorganic fiber bundle formed on the needle protrusion marks is determined by the shape of the needle, and thus is not particularly limited; however, the size is preferably a diameter of at least about 0.5 mm and at most about 10.0 mm. When the size of the inorganic fiber bundles is set in the above range, it is easier to further reduce the frictional force exerted between the surface of the mat member and the inner face of the outer pipe, upon manufacturing a muffler by using the mat member according to the embodiments of the present invention.

The amount of an organic binder contained in the mat member according to the embodiments of the present invention is preferably set to at least about 0.5% and at most about 12.0% by weight, more preferably set to at least about 0.5% and at most about 5.0% by weight, and further more preferably set to at least about 0.5% and at most about 1.0% by weight. In the case where the amount of the organic binder is about 0.5% or more by weight, since the inorganic fibers tend to bond to one another, dropping of inorganic fibers forming the mat member becomes less likely to occur. In contrast, in the case where the amount of the organic binder is about 12.0% or less by weight, since the amount of the organic component to be discharged from the muffler tends not to increase when used as the muffler, load is less likely to be imposed on the environment.

Although not particularly limited, the basis weight of the mat member according to the embodiments of the present invention is preferably set to at least about 900 $g/m^2$ and at most about 3000 $g/m^2$, and is more preferably set to at least about 1500 $g/m^2$ and at most about 2800 $g/m^2$.

Although not particularly limited, the thickness of the mat member of the present invention is preferably set to at least about 6 mm and at most about 31 mm, and is more preferably set to at least about 9 mm and at most about 20 mm.

In a method for manufacturing the mat member according to the embodiments of the present invention, the shape of a barb to be used for forming entangled inorganic fibers and inorganic fiber bundles is not particularly limited to the above-mentioned shape that protrudes in the direction to the tip direction of the needle, as long as it can form the entangled inorganic fibers and inorganic fiber bundles. For example, a shape that protrudes in the direction to the root of the needle may be used.

In this case, however, since inorganic fiber precursors tend not to be wound by the barb upon penetrating the needles to the sheet member, bundle-shaped inorganic fiber precursors are less likely to be formed on the needle protrusion marks. In contrast, since the inorganic fiber precursors are wound in the barb upon drawing out the needles, bundle-shaped inorganic fiber precursors are more easily formed on the needle penetration marks. Therefore, when this sheet member is fired, it becomes possible to obtain a mat member in which the inorganic fiber bundles are formed on the surface having the needle penetration marks and no inorganic fiber bundles are formed on the surface having the needle protrusion marks.

In the method for manufacturing the mat member according to the embodiments of the present invention, a specific example of the inorganic compound contained in a mixed solution (spinning mixture) used for manufacturing the inorganic fiber precursor (inorganic fiber precursor that is converted into an inorganic fiber containing only alumina (alumina and silica) after firing) is not particularly limited to the above-mentioned basic aluminum chloride, and any inorganic compound may be used as long as it is converted into alumina after the firing. Examples of the inorganic compound that is converted into alumina after the firing include basic aluminum acetate, aluminum oxychloride, and the like.

On the other hand, upon manufacturing inorganic fibers containing only silica (alumina and silica), an inorganic compound that is converted into silica after the firing may be used, and examples of the inorganic compound include silica sol, tetraethyl silicate, an water-soluble siloxane derivative, and the like.

Upon manufacturing inorganic fibers containing alumina and silica, preferably, silica sol is blended into an aqueous solution of basic aluminum chloride so that, for example, the compounding ratio in the inorganic fibers after the firing is set to $Al_2O_3:SiO_2$ of at least about (60:40) and at most about (80:20) (weight ratio). More preferably, in particular, silica sol is blended into the aqueous solution of basic aluminum chloride so that the compounding ratio in the inorganic fibers after the firing is set to $Al_2O_3:SiO_2$ of at least about (70:30) and at most about (74:26).

Although not particularly limited, examples of the organic polymer to be added to the mixed solution (spinning mixture) include a water-soluble organic polymer, such as polyethylene oxide, hydroxyethyl cellulose, hydroxymethyl cellulose, carboxymethyl cellulose, polyethylene glycol, and sodium polyacrylate, in addition to the above-mentioned polyvinyl alcohol.

In the method for manufacturing the mat member according to the embodiments of the present invention, the amount of solution of the spinning mixture to be extruded from a spinning mixture supply nozzle by a blowing method is preferably set to at least about 3 mL/h and at most about 50 mL/h. Under this condition, the spinning solution extruded from the spinning mixture supply nozzle is sufficiently extended, without being sprayed (atomized), so that the inorganic fiber precursors are hardly melt-bonded to each other; thus, it becomes easier to obtain uniform inorganic fiber precursors (inorganic fibers) with a narrow fiber diameter distribution.

In the method for manufacturing the mat member according to the embodiments of the present invention, for manufacture of a mat member in which the area density of the second inorganic fiber bundles formed on the first surface and the area density of the first inorganic fiber bundles formed on the second surface are different from each other, it is possible to apply a method in which two needle boards having the same needle-area density are used and then the number of times of needle punching is changed between them, in addition to the above-mentioned method which uses two needle boards on which the needles are attached with mutually different densities.

Moreover, in the method for manufacturing the mat member according to the embodiments of the present invention, in the case of manufacturing a mat member in which the area density of the second inorganic fiber bundles formed on the first surface and the area density of the first inorganic fiber bundles formed on the second surface are equal, the following method may also be applied.

First, two needle boards to which needles are attached with the same density are prepared, and each of the needle boards is placed apart from the first surface or the second surface of a sheet member. At this time, the needle boards are placed in such a manner that the needles formed on one board and the needles formed on the other board are alternately disposed, without coming into collision, in the needle punching.

Next, needle punching is carried out by allowing the needle boards to simultaneously descend and ascend along the thickness direction of the sheet member so as to manufacture a needle-punched body. In this case, with respect to the two faces of the sheet member, each of the needles is allowed to completely penetrate until a barb formed on the tip of the needle completely protrudes from the opposite surface of the sheet member.

By performing each of the processes of the first embodiment in the same manner on the resulting needle-punched body, it is possible to manufacture a mat member in which the area density of the second inorganic fiber bundles formed on the first surface and the area density of the first inorganic fiber bundles formed on the second surface are equal.

In the method for manufacturing the mat member according to the embodiments of the present invention, the organic binder contained in the organic binder solution in which the cut-off sheet member is impregnated is not limited to the above-mentioned acrylic resin, and examples of the organic binder may include rubber such as acrylic rubber, a water-soluble organic polymer such as carboxymethyl cellulose or polyvinyl alcohol, a thermoplastic resin such as styrene resin, a thermosetting resin such as epoxy resin, and the like. Out of those examples, acrylic rubber, acrylonitrile-butadiene rubber, and styrene-butadiene rubber are particularly preferable.

The above-mentioned organic binder solution may contain a plurality of kinds of the above-mentioned organic binders.

Moreover, in addition to a latex formed by dispersing water in the above-mentioned organic binder, an example of the organic binder solution may include a solution or the like formed by dissolving the above-mentioned organic binder in water or an organic solvent.

In the method for manufacturing the mat member according to the embodiments of the present invention, upon drying the impregnated sheet member under pressure, preferably drying is performed at a temperature of at least about 95° C. and at most about 155° C. In the case where the temperature is about 95° C. or more, the drying time is not likely to be prolonged, and thus the production efficiency is less likely to be reduced. In contrast, in the case where the temperature is about 155° C. or less, the inorganic binder tends not to be decomposed, with the result that the inorganic fibers forming a mat member more easily bond to one another, hardly causing dropping of the inorganic fibers.

Moreover, in the method for manufacturing the mat member according to the embodiments of the present invention, an example of the method for manufacturing inorganic fibers having mutually different average fiber diameters is, for example, a method in which inorganic fiber precursors having substantially the same average fiber diameter as the above-mentioned range are formed by altering conditions under which the spinning mixture is spun in a blowing method, that is, for example, by altering the flow rate of a gas blowing out from the air nozzle.

Upon manufacturing inorganic fibers having mutually different average fiber diameters by altering the flow rate of a gas blowing out from the air nozzle, the flow rate of the gas blowing out from the air nozzle is preferably set to at least about 40 m/s and at most about 200 m/s. Moreover, the diameter of the spinning mixture supply nozzle is preferably set to at least about 0.1 mm and at most about 0.5 mm. Furthermore, the amount of the solution of the spinning mixture to be extruded from the spinning mixture supply nozzle is preferably set to at least about 1 mL/h and at most about 120 mL/h.

In the muffler according to the embodiments of the present invention, the side surface of the inner pipe may be wrapped with a plurality of layers of mat members. In this case, the closer each of the mat members is to the outer pipe, the longer its length may be set. A muffler having this kind of structure can be manufactured by wrapping the side surface of the inner pipe with a mat member and further wrapping the side surface bearing the mat member with another mat member, and then repeating those wrappings to obtain the inner pipe having the side surface wrapped with the plurality of layers of the mat members, and thereafter, the same process as those in the first embodiment are performed by using the resulting inner pipe.

Here, it is preferable that the mat member placed at the side of the inner pipe of the muffler, among the plurality of mat members, includes a material having a high heat resistant property. This is because, the temperature of the inner pipe becomes high due to high-temperature exhaust gases directed thereto, and thus the mat member to be placed on the inner pipe side needs to have high-temperature resistance. More specifically, the mat member preferably includes inorganic fibers mainly containing alumina, silica and the like.

In contrast, high-temperature resistance is not required for the mat member to be placed on the outer pipe side where the temperature is lower than the inner pipe side, in comparison to the mat member to be placed on the inner pipe side. For this reason, the mat member to be placed on the outer pipe side may contain a material having a lower heat resistant property than that of the above-mentioned inorganic fibers. More specifically, preferably, the mat member mainly contains glass fibers and the like.

Moreover, in the muffler, the side surface of the inner pipe may be wrapped with a single mat member in a spiral pattern. In this case, the shape of the mat member is preferably a substantially rectangular, elongated flat plate shape in a plan view, with a width that is sufficiently smaller than the length of the inner pipe and a length that substantially corresponds to the length of the outer circumference of the inner pipe multiplied by the number of wrappings of the mat member.

Here, upon manufacturing a muffler of this kind, the mat member having the above-mentioned shape is wrapped around the side surface of the inner pipe in a spiral pattern while avoiding overlapping of the mat member; thus, a muffler can be manufactured in the same manner as in the first embodiment by using the resulting inner pipe.

In the muffler according to the embodiments of the present invention, the length of the inner pipe may be substantially equal to the total length including the length of the outer pipe and the length of the thickness of the two end portion members placed on the both ends of the outer pipe. In this case, the resulting shape corresponds to the shape of the muffler 70 of the first embodiment shown in FIGS. 4A and 4B in which the two end portions of the inner pipe 73 do not protrude from the end faces of the end portion members 72.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mat member for a muffler comprising:
  fibers consisting of inorganic fibers;
  a first surface having a plurality of needle penetration marks and/or a plurality of needle protrusion marks; and
  a second surface opposite to the first surface having a plurality of needle protrusion marks and/or a plurality of needle penetration marks, a plurality of needle marks being formed in the mat member by needle punching and extending from the needle penetration mark to the needle protrusion mark b using a needle having a plurality of spine-shaped intrusions that protrude toward a tip direction formed substantially all over a side surface of a tip portion, an inorganic fiber bundle formed at said needle protrusion mark and including a plurality of said inorganic fibers oriented in a closed loop configuration, the plurality of said inorganic fibers oriented in the closed loop configuration being formed by punching a sheet member which includes inorganic fiber precursor with the needle to form said inorganic fiber precursor oriented in a closed loop and by firing the inorganic fiber precursor oriented in the closed loop, wherein the inorganic fiber precursor is manufactured by spinning a spinning mixture containing at least an inorganic compound and an organic polymer and wherein the inorganic fiber precursor comprises the organic polymer and inorganic compound and firing removes the organic polymer.

2. The mat member for as muffler according to claim 1, wherein
  said needle marks comprise
  a first needle mark extending from a first needle penetration mark formed on the first surface of said mat member to it first needle protrusion mark formed on the second surface; and
  a second needle mark extending from a second needle penetration mark formed on the second surface of said mat member to a second needle protrusion mark thrilled on the first surface.

3. The mat member for a muffler according to claim 2, wherein
  an area density of a second inorganic fiber bundle formed on said first surface and an area density of a first inorganic fiber bundle formed on said second surface are different from each other.

4. The mat member for a muffler according to claim 1, wherein
  said inorganic fibers have an average fiber diameter of at least about 3 μm and at most about 10 μm.

5. The mat member for a muffler according to claim 1, wherein
  said needle marks have an area density of at least about 7 pcs/cm$^2$ and at most about 30 pcs/cm$^2$.

6. The mat member for a muffler according to claim 1, wherein
  said inorganic fibers comprises at least one of alumina and silica.

7. The mat member for a muffler according to claim 1, further comprising an organic binder.

8. A method for manufacturing a mat member for a muffler, comprising:
  spinning a spinning mixture containing at least an inorganic compound and an organic polymer to manufacture an inorganic fiber precursor;
  compressing said inorganic fiber precursor to manufacture a sheet member;
  punching said sheet member with at least one needle having a plurality of spine-shaped protrusions that protrude toward a tip direction formed substantially all over a side surface of a tip portion from at least one of a first surface of said sheet member and a second surface of said sheet member opposite to the first surface to manufacture a needle-punched body in which a bundle-shaped inorganic fiber precursor including said inorganic fiber precursor oriented in a dosed loop configuration is formed on at least one of the first surface and the second surface; and
  firing said needle-punched body so as to produce a mat member containing fibers consisting of inorganic fibers and haying inorganic fiber bundles including said inorganic fibers oriented in a closed loop configuration which are formed by firing said bundle-shaped inorganic fiber precursor.

9. The method for manufacturing a mat member for a muffler according to claim 8, wherein said sheet member is punched with the at least one needle from both of the first surface and the second surface.

10. The method for manufacturing a mat member for a muffler according to claim 9, wherein a number of needles with which said sheet member is punched from the first surface is different from a number of needles with which said sheet member is punched from the second surface.

11. The method for manufacturing a mat member for a muffler according to claim 9, wherein a number of punching with needles with which said sheet member is punched from the first surface is different from a number of punching with needles with which said sheet member is punched from the second surface.

12. The method for manufacturing a mat member for a muffler according to claim 8, wherein the inorganic fibers forming said mat member have an average fiber diameter of at least about 3 μm and at most about 10 μm.

13. The method for manufacturing a mat member for a muffler according to claim 8, wherein an area density at needle marks formed in said sheet member by punching with the needle is at least about 7 pcs/cm$^2$ and at most about to 30 pcs/cm$^2$.

14. The method for manufacturing a mat member for a muffler according to claim 8, wherein said inorganic compound comprises at least one of an inorganic compound which is converted into alumina after being fired and an inorganic compound which is Converted into silica after being fired.

15. The method for manufacturing a member for a muffler according to claim 8, further comprising:
impregnating, after firing said needle-punched body, the fired needle-punched body with an organic binder solution so as to manufacture impregnated mat member; and
drying said impregnated mat member.

16. A muffler to be place on an exhaust path of an internal combustion engine, comprising:
an inner pipe having a side surface and a plurality of holes provided on the side surface;
the mat member according to claim 1 wrapped around the side surface of said inner pipe;
an outer pipe having first and second end openings and containing the inner pipe wrapped with said mat member; and
first second end portion members disposed too close the first and second end openings, respectively.

17. A muffler to be placed on an exhaust path of an internal combustion engine, comprising:
an inner pipe having a side surface and a plurality of holes provided on the side surface;
the mat member which is manufactured by the method according to claim 8 and which is wrapped around the side surface of said inner pipe;
outer pipe having first and second end openings and containment the inner pipe wrapped with said mat member; and
first and second end portion members disposed to close the first and second end openings, respectively.

18. A method for manufacturing a muffler, comprising:
providing a mat member comprising:
fibers consisting of inorganic fibers;
a first surface having a plurality of needle penetration marks and/or a plurality of needle protrusion marks;
a second surface opposite to the first surface having to plurality of needle protrusion marks and/or a plurality of needle penetration marks, a plurality of needle marks being formed in the mat member by needle punching and extending from the needle penetration mark to the needle protrusion mark by using a needle having a plurality of spine-shaped protrusions that protrude toward a tip direction formed substantially all over a side surface of a tip portion, an inorganic fiber bundle formed at said needle protrusion mark and including a plurality of said inorganic fibers oriented in a closed loop configuration, the plurality of said inorganic fibers oriented in the closed loop configuration being formed by punching a sheet member which includes inorganic fiber precursor with the needle to form said inorganic fiber precursor oriented in a closes loop and by firing the inorganic fiber precursor oriented in the closed loop;
wrapping the mat member around a side surface of an inner pipe having a plurality of small holes;
press-fitting said inner pipe wrapped with the mat member into an outer pipe to produce a press-fitted body in it manner that said inorganic fiber bundles contact an inner surface of the outer pipe;
disposing first and second end portion members to close first and second end openings of the outer pipe, respectively; and
securing said first and second end portion members to the outer pipe.

19. A method for manufacturing a muffler, comprising:
spinning a spinning mixture containing at least an inorganic compound and an organic polymer to manufacture an inorganic fiber precursor;
compressing said inorganic fiber precursor to manufacture a sheet member;
punching said sheet member with at least one needle having a plurality of spine-shaped protrusions that protrude toward a tip direction formed substantially all over a side surface of a tip portion from at least one of a first surface of said sheet member and a second surface of said sheet member apposite to the first surface to manufacture a needle-punched body in which a bundle-shaped inorganic fiber precursor including said inorganic fiber precursor oriented in a dosed loop configuration is formed on at least one of the first surface and the second surface;
filing said needle-punched body so as to produce a mat member containing fibers consisting of inorganic fibers and hay Mg inorganic fiber bundles including said inorganic fibers oriented in a closed loop configuration which are formed by firing said bundle-shaped inorganic fiber precursor;
wrapping the mat member around a side surface of an inner pipe having a plurality of small holes;
press-fitting said inner pipe wrapped with the mat member into an outer pipe to produce a press-fitted body in it manner that said inorganic fiber bundles contact an inner surface of the outer pipe;
disposing first and second end portion members to close first and second end openings of the outer pipe, respectively; and
securing said first and second end portion members to the outer pipe.

20. The mat member for a muffler according to claim 1, wherein said inorganic fibers oriented in the closed loop configuration having a diameter of at least about 0.10 mm and at most about 10.0 mm.

21. The method for manufacturing a mat member for a muffler according to claim 8, wherein said inorganic fibers oriented in the closed loop configuration having a diameter of at least about 0.10 mm and at most about 10.0 mm.

22. The method for manufacturing a muffler according to claim 18, wherein said inorganic fibers oriented in the closed loop configuration having a diameter of at least about 0.10 mm and at most about 10.0 mm.

23. The method for manufacturing a muffler according to claim 19, wherein said inorganic fibers oriented in the closed loop configuration having a diameter of at least about 0.10 mm and at most about 10.0 mm.

\* \* \* \* \*

UNITED STATES PATENT AND TRADEMARK OFFICE
CERTIFICATE OF CORRECTION

PATENT NO.         : 8,887,863 B2
APPLICATION NO.    : 12/245798
DATED              : November 18, 2014
INVENTOR(S)        : Takahiko Okabe and Daisuke Suzuki It is certified that error appears in the above-identified patent and that said Letters Patent is hereby corrected as shown below:

In the Claims,

Column 37, line 63, "b" should be changed to --by--; line 64, "intrusions" should be changed to --protrusions--.

Column 38, line 24, "thrilled" should be changed to --formed--; line 62, "dosed" should be changed to --closed--.

Column 39, line 32, "Converted" should be changed to --converted--; line 49, "first second" should be changed to --first and second--; line 49, "too" should be changed to --to--; line 58, "outer pipe" should be changed to --an outer pipe--.

Column 40, line 1, "having to" should be changed to --having a--; line 18, "closes" should be changed to --closed--; line 23, "it" should be changed to --a--; line 42, "apposite" should be changed to --opposite--; line 45, "dosed" should be changed to --closed--; line 49, "hay Mg" should be changed to --having--; line 56, "it" should be changed to --a--.

Signed and Sealed this
Twenty-eighth Day of April, 2015

Michelle K. Lee
*Director of the United States Patent and Trademark Office*